United States Patent
Gershzohn

(10) Patent No.: US 8,761,971 B2
(45) Date of Patent: Jun. 24, 2014

(54) AUTO-FLIGHT SYSTEM PILOT INTERFACE

(75) Inventor: Gary Gershzohn, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 13/348,294

(22) Filed: Jan. 11, 2012

(65) Prior Publication Data
US 2013/0179009 A1 Jul. 11, 2013

(51) Int. Cl.
*G05D 1/00* (2006.01)
*G05D 1/10* (2006.01)

(52) U.S. Cl.
USPC ............... 701/11; 701/3; 340/971; 340/973

(58) Field of Classification Search
USPC ............................................. 701/11
See application file for complete search history.

(56) References Cited

U.S. PATENT DOCUMENTS

| | | | |
|---|---|---|---|
| 5,978,715 A * | 11/1999 | Briffe et al. ............ | 701/11 |
| 6,112,141 A * | 8/2000 | Briffe et al. ............ | 701/14 |
| 6,405,107 B1 * | 6/2002 | Derman .................. | 701/3 |
| 6,745,113 B2 * | 6/2004 | Griffin et al. ........... | 701/3 |
| 7,103,455 B2 * | 9/2006 | Subelet .................. | 701/3 |
| 7,970,502 B2 | 6/2011 | Boorman et al. | |
| 8,570,192 B2 * | 10/2013 | McLoughlin et al. ....... | 340/973 |
| 2006/0238511 A1 * | 10/2006 | Gyde et al. ............. | 345/168 |
| 2008/0300735 A1 * | 12/2008 | He ....................... | 701/3 |
| 2010/0152928 A1 * | 6/2010 | Aymeric et al. ......... | 701/3 |
| 2011/0035082 A1 * | 2/2011 | Loots et al. ............. | 701/16 |
| 2011/0125347 A1 | 5/2011 | Boorman et al. | |
| 2012/0179368 A1 * | 7/2012 | Walter ................... | 701/465 |
| 2013/0013133 A1 * | 1/2013 | Walter ................... | 701/11 |

OTHER PUBLICATIONS

Carbaugh et al., "Vertical Situation Display for Improved Flight Safety and Reduced Operating Costs," Boeing Commercial Airplanes, Technology/Product Development, Aero, No. 20, Oct. 2002, pp. 3-11.

Butler et al., "A Formal Methods Approach to the Analysis of Mode Confusion," 17th Digital Avionics Systems Conference, Oct. 1998, pp. 1-8, accessed May 21, 2012 http://shemesh.larc.nasa.gov/fm/papers/butler-etal-dasc98.pdf.

Degani et al., "Pilot-Autopilot Interaction: A Formal Perspective," 8th International Conference on Human-Computer Interaction in Aeronautics, 2002, pp. 1-11, accessed May 21, 2012 http://ti.arc.nasa.gov/m/profile/adegani/Pilot-autopilot%20interaction.pdf.

(Continued)

*Primary Examiner* — Khoi Tran
*Assistant Examiner* — Ryan Rink
(74) *Attorney, Agent, or Firm* — Yee & Associates, P.C.

(57) ABSTRACT

An aircraft system comprising a display system, a graphical user interface, a first grouping of the controls in the graphical user interface, and a second grouping of the controls in the graphical user interface. The graphical user interface is configured to display controls on the display system. The controls are for commands sent to an auto-flight system in an aircraft that control flight of the aircraft. The first grouping of the controls is configured to control sending of the commands to the auto-flight system from a flight management system in the aircraft. The second grouping of the controls is configured to control sending of the commands to the auto-flight system from a user input to the graphical user interface.

20 Claims, 17 Drawing Sheets

(56) References Cited

OTHER PUBLICATIONS

Miller et al., "Flight Guidance System Requirements Specification," NASA Center for AeroSpace Information (CASI), NASA/CR-2003-212426, Jun. 2003, 175 Pages, accessed May 21, 2012 http://www.cs.odu.edu/~mln/ltrs-pdfs/NASA-2003-cr212426.pdf.

Mumaw et al., "A Simulator Study of Pilots' Monitoring Strategies and Performance on Modern Glass Cockpit Aircraft," Proceedings of the Human Factors and Ergonomics Society 45th Annual Meeting, Oct. 2001, pp. 73-77, accessed May 21, 2012 http://www.humanfactors.illinois.edu/reports&paperspdfs/humfac01/mumniksarhf01.pdf.

Rosenkrans, "Autoflight Audit," Aerosafety World, Flight Safety Foundation, Jun. 2008, pp. 30-35, accessed May 21, 2012 http://flightsafety.org/asw/jun08/asw_jun08_p30-35.pdf?d1=1

Miller et al., "A Methodology for Improving Mode Awareness in Flight Guidance Design," Proceedings of the 21st Digital Avionics Systems Conference, Oct. 2002, pp. 7D-1-7D1-11, accessed May 21, 2012 http://shemesh.larc.nasa.gov/fm/papers/Miller-Methodology-mode-awareness.pdf.

Leveson et al., "Analyzing Software Specifications for Mode Confusion Potential," Proceedings of a Workshop in Human Error and System Development, Mar. 1997, pp. 132-146, accessed May 21, 2012 http://www.safeware-eng.com/system%20and%20software%20safety%20publications/AnSofSpec.pdf.

Boorman et al., "A New Autoflight/FMS Interface: Guiding Design Principles", Proceedings of the International Conference on Human-Computer Interaction in Aeronautics, 2004, 6 Pages.

"Human Factors Aspects in Incidents / Accidents," Flight Operations Briefing Notes, Airbus Customer Services, Flight Operations Support and Line Assistance, May 2004, pp. 1-10, accessed May 21, 2012 http://www.smartcockpit.com/pdf/flightops/humanfactors/10.

"Optimum Use of Automation," Flight Operations Briefing Notes, Airbus Customer Services, Flight Operations Support and Line Assistance, Jan. 2004, pp. 1-14, accessed May 21, 2012 http://www.smartcockpit.com/pdf/flightops/flyingtechnique/49.

Ahlstrom et al., "Computer Human Interface Guidelines: A Revision to Chapter 8 of the Human Factors Design Guide," Federal Aviation Administration, Human Factors Division, Apr. 2001, 271 Pages, accessed May 21, 2012 http://www.hf.faa.gov/docs/508/docs/chichapter8final.pdf.

"FSF ALAR Briefing Note 1.2—Golden Rules," ALAR Approach-and-landing Accident Reduction Tool Kit, Flight Safety Foundation, Flight Safety Digest, Aug.-Nov. 2000, pp. 17-20, accessed May 21, 2012 http://flightsafety.org/files/alar_bn1-3-goldrules.pdf.

"Raytheon Hawker 4000 Avionics," Honeywell Aerospace, Apr. 2006, 8 Pages, accessed May 21, 2012 http://www.honeywellbusinessaviation.com/resources/dyn/files/395300z4b9e340/_fn/primus-epic-hawker-4000.pdf.

Vakil et al., "Applying a Common Conceptual Model Approach to Vertical Navigation Automation," Proceedings of 2nd Workshop on Human Error, Safety and System Development, Apr. 1998, pp. 28-35, accessed May 21, 2012 http://www.dcs.gla.ac.uk/~johnson/papers/seattle_hessd/sanjay-p.pdf.

Lund, "Lund's Expert Ratings of Usability Maxims," Ergonomics in Design, 5(3), 15-20. A study of the heuristics design experts consider important for good design, 1997, 5 Pages, accessed May 21, 2012 http://www.simonwhatley.co.uk/lunds-expert-ratings-of-usability-maxims.

* cited by examiner

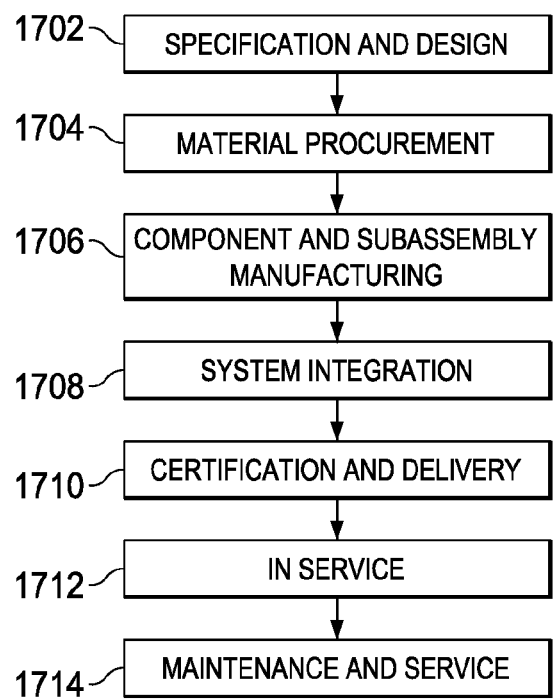
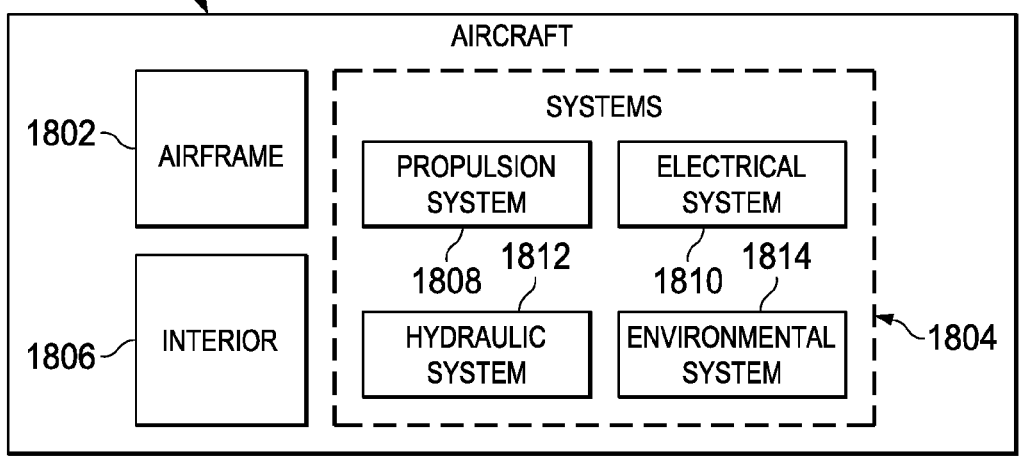

AUTO-FLIGHT SYSTEM PILOT INTERFACE

BACKGROUND INFORMATION

1. Field

The present disclosure relates generally to aircraft and, in particular, to operating an aircraft. Still more particularly, the present disclosure relates to a method and apparatus for managing the operation of an aircraft and auto-flight system in an aircraft.

2. Background

A flight management system is a part of the avionics for commercial aircraft. A flight management system is a computer system that automates the performance for various tasks during the flight of an aircraft. The flight management system also may reduce the workload on the flight crew.

The flight management system typically provides in-flight management of a flight plan for the aircraft. The flight management system receives input from various sensors to identify the position of the aircraft. With the position of the aircraft, the flight management system may be used to guide the aircraft to follow the flight plan.

When the flight management system guides the aircraft using the flight plan, commands are sent by the flight management system to an auto-flight system to cause the aircraft to fly along a path defined by the flight plan. Additionally, a pilot may also send commands to the auto-flight system to make adjustments to the flight plan. The pilot may receive changes to the flight plan from an air traffic controller. The air traffic controller is an operator that is part of air traffic control. Air traffic control is a service that directs aircraft on the ground and in the air.

For example, the pilot may be directed to fly at a different altitude. With this change, the pilot may send a command to the auto-flight system to change the altitude from what is currently commanded by the flight management system for the flight plan. The pilot also may make other adjustments, such as changes to speed, track, and other parameters for the aircraft.

These changes are often input through a mode control panel (MCP). For example, the mode control panel may be used to instruct the auto-flight system to hold a specific altitude, change altitudes at a specific rate, hold a specific heading, turn to a new heading, and other operations.

The currently used mode control panels are complex in their design and operation. Different functions are available based on the combination of modes that may be present. As a result, the number of functions that may be performed based on different modes may result in pilots being unable to understand all of the different capabilities that may be provided by the mode control panel. Therefore, it would be desirable to have a method and apparatus that takes into account at least some of the issues discussed above as well as possibly other issues.

SUMMARY

In an illustrative embodiment, an aircraft system comprising a display system, a graphical user interface, a first grouping of the controls in the graphical user interface, and a second grouping of the controls in the graphical user interface is present. The graphical user interface is configured to display controls on the display system. The controls are for commands sent to an auto-flight system in an aircraft that control flight of the aircraft. The first grouping of the controls is configured to control sending of the commands to the auto-flight system from a flight management system in the aircraft. The second grouping of the controls is configured to control sending of the commands to the auto-flight system from a user input to the graphical user interface.

In another illustrative embodiment, an aircraft system comprises a display system, a graphical user interface, and a plurality of groupings of controls. The graphical user interface is configured to display controls on the display system. The controls are for commands sent to an auto-flight system for an aircraft and control flight of the aircraft. The plurality of groupings of the controls is in the graphical user interface. A grouping in the plurality of groupings of the controls is configured to control sending the commands to the auto-flight system from sources of the commands. The grouping of the controls corresponds to a source in the sources of the commands.

In still another illustrative embodiment, a method for controlling an aircraft is present. A first grouping of controls for commands is displayed in a graphical user interface. The controls are for the commands sent to an auto-flight system in an aircraft that control flight of the aircraft. The first grouping of the controls is configured to control sending of the commands to the auto-flight system from a flight management system. The second grouping of the controls is displayed in the graphical user interface. The second grouping of the controls is configured to control sending of the commands to the auto-flight system from a user input to the graphical user interface. The commands are sent to the auto-flight system from at least one of the flight management system and from the user input based on a selection of a number of controls from at least one of the first grouping of the controls and the second grouping of the controls.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 17 is an illustration of an aircraft manufacturing and service method in accordance with an illustrative embodiment; and FIG. 18 is an illustration of an aircraft in which an illustrative embodiment may be implemented.

DETAILED DESCRIPTION

Figure 1:
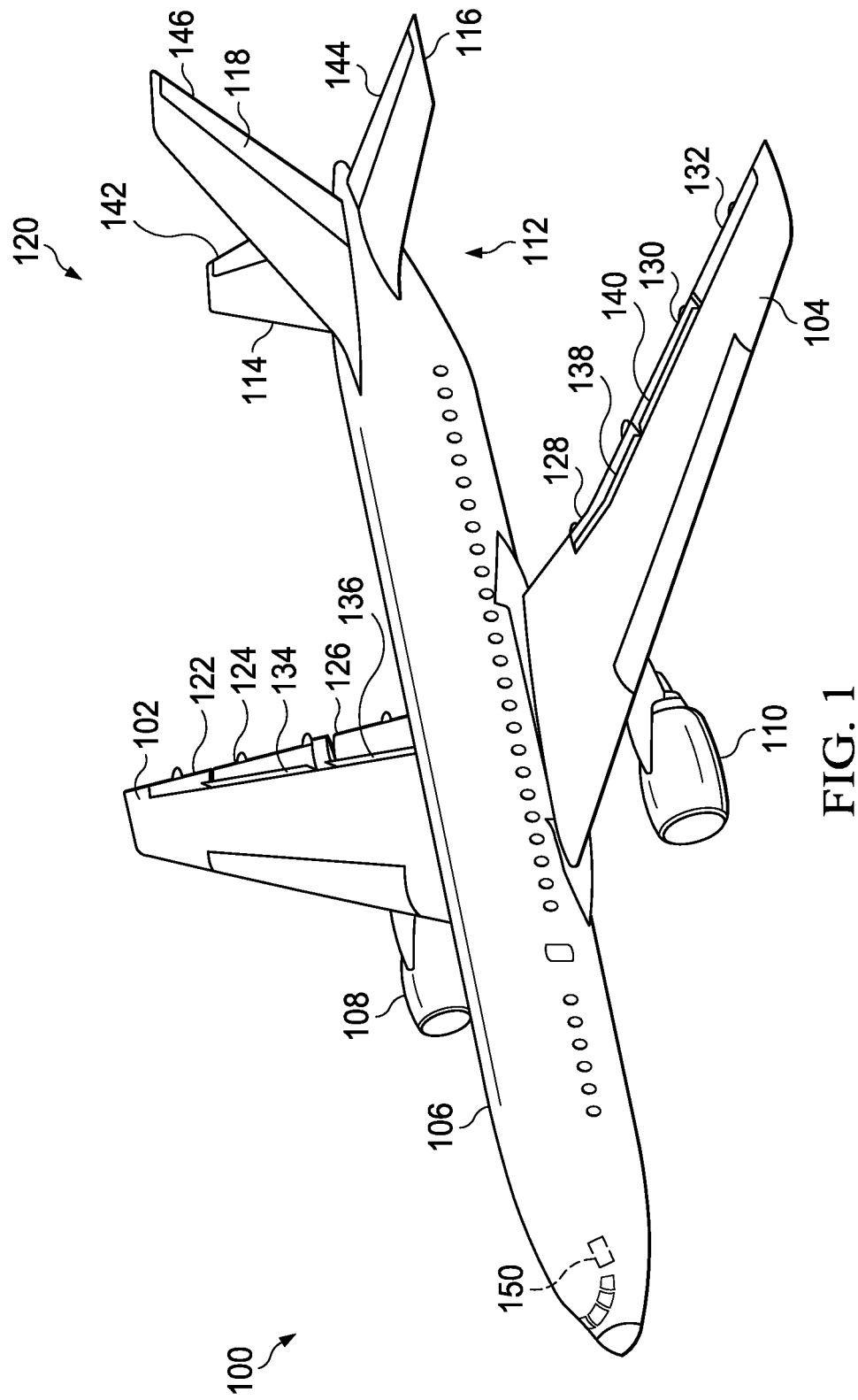
FIG. 1 is an illustration of an aircraft in accordance with an illustrative embodiment.

With reference now to the figures and, in particular, with reference now to FIG. 1, an illustration of an aircraft is depicted in accordance with an illustrative embodiment. Aircraft 100 has wing 102 and wing 104 attached to body 106. Aircraft 100 also includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Additionally, aircraft 100 also includes control surfaces 120. As depicted, control surfaces 120 include flaps 122, 124, 126, 128, 130, and 132. Control surfaces 120 also include spoilers 134, 136, 138, and 140. Control surfaces 120 also may include elevator 142, elevator 144, and rudder 146. Of course, other types of control surfaces may be present, although they are not depicted in this illustrative example. Examples of other types of control surfaces may include, for example, at least one of ailerons, slats, air brakes, flaperons, and other suitable types of control surfaces.

As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

In these illustrative examples, aircraft system 150 controls the movement of aircraft 100. In particular, aircraft system 150 controls the operation of components, such as control surfaces 120, engine 108, and engine 110 to control movement of aircraft 100. One or more illustrative embodiments may be implemented in aircraft 100 to facilitate the movement of aircraft 100 using aircraft system 150.

Figure 2:
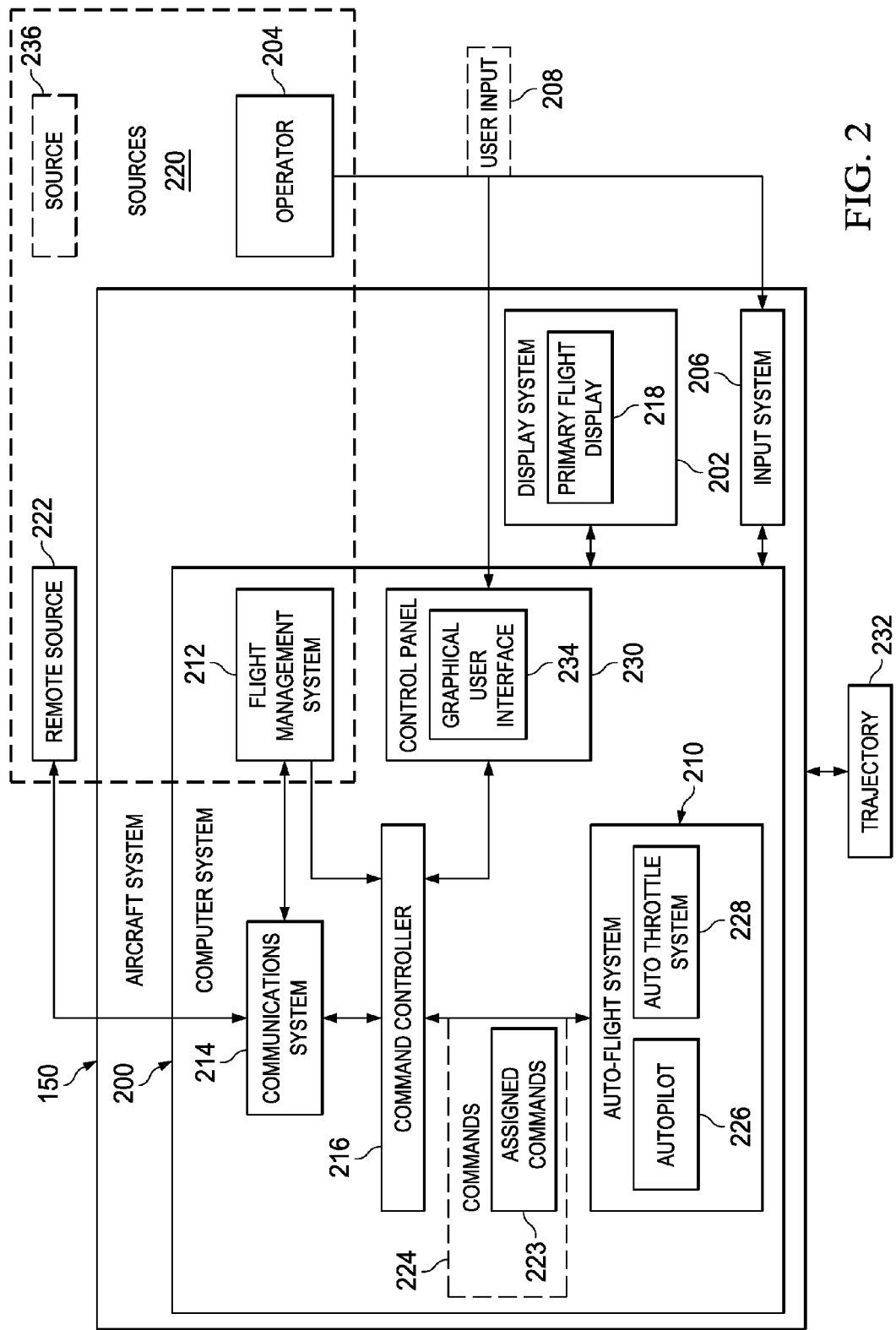
FIG. 2 is an illustration of an aircraft system in accordance with an illustrative embodiment.

With reference now to FIG. 2, an illustration of an aircraft system is depicted in accordance with an illustrative embodiment. In this illustrative example, different components in aircraft system 150 may be implemented in computer system 200.

Computer system 200 comprises a number of computers. A "number", as used herein with reference to items, means one or more items. For example, "number of computers" is one or more computers. When more than one computer is present in computer system 200, those computers may be in communication with each other. The communication may occur through the use of a communication system, such as a network, or another suitable type of system.

Aircraft system 150 also includes display system 202, which is connected to computer system 200. In these illustrative examples, display system 202 comprises hardware. In particular, display system 202 includes a number of display devices connected to computer system 200. These display devices may take various forms, such as, for example, a liquid crystal display, an organic light emitting diode display, and other suitable types of display devices.

Further, operator 204 may interact with computer system 200 using input system 206. Input system 206 comprises hardware and is connected to computer system 200. As depicted, input system 206 comprises a number of input devices. An input device is a hardware device configured to receive user input 208 from operator 204.

The number of input devices in input system 206 may include at least one of a keyboard, a physical control, a button, a trackball, a mouse, a touch-screen, and other suitable types of input devices. When a touch-screen is used, the touch-screen may form both a part of input system 206 and display system 202.

In these illustrative examples, auto-flight system 210, flight management system 212, communications system 214, command controller 216, and other suitable components for aircraft 100 in FIG. 1 may be implemented in computer system 200. These components may be implemented using hardware, software, or a combination of the two. When hardware is present, one or more of these components include circuits that are associated with computer system 200. When software is present, one or more of these components may be implemented as program code that is run by computer system 200.

As depicted, auto-flight system 210 is configured to control the movement of aircraft 100. Auto-flight system 210 may control the movement of aircraft 100 using commands 224. Auto-flight system 210 may receive commands 224 from sources 220. In these illustrative examples, sources 220 may include at least flight management system 212, operator 204, remote source 222, and other suitable sources configured to generate and/or send commands to auto-flight system 210.

Remote source 222 may include a number of sources in a number of locations remote to aircraft 100. For example, remote source 222 may include at least one of a navigation aid, a ground station for an entity operating aircraft 100, and other suitable sources remote to aircraft 100. Operator 204 is an operator in aircraft 100 in these illustrative examples. Operator 204 may be, for example, without limitation, a pilot, a co-pilot, a ground station operator, or some other crew member or operator.

In these illustrative examples, communications system 214 in aircraft 100 allows information to be exchanged between aircraft 100 and a remote location over a wireless communications link in these examples. For example, communications system 214 allows information to be exchanged between remote source 222 and aircraft 100. The information exchanged may include, for example, at least one of voice communications, data, flight plan changes, flight plans, logs, notices to airmen (NOTAMs), and other suitable information.

Flight management system 212 is a system configured to aid operator 204 in operating aircraft 100. Flight management system 212 may be comprised of one or more computers. These computers may be referred to as flight management computers.

In these illustrative examples, flight management system 212 may automate a number of in-flight tasks in a manner that reduces the workload on operator 204 in aircraft 100. For example, flight management system 212 may provide in-flight management of a flight plan for aircraft 100. Flight management system 212 also may display information to operator 204 using primary flight display 218 in display system 202.

As depicted, flight management system 212 may generate and send commands to auto-flight system 210. These commands may form at least a portion of commands 224 received by auto-flight system 210. Auto-flight system 210 may use the commands received from flight management system 212 to control the flight of aircraft 100 along a path defined by a particular flight plan. The path defined by the flight plan may be in three-dimensional space and may be defined by waypoints.

In some illustrative examples, commands 224 received from sources 220 may be approved by operator 204 prior to commands 224 being sent to auto-flight system 210. For example, a source, such as remote source 222, may send an altitude command to aircraft 100. Aircraft 100 may receive this altitude command through communications system 214 and present the altitude command to operator 204 on display system 202 for approval by operator 204. If the altitude command is approved by operator 204, the altitude command may be sent to flight management system 212 for processing. Flight management system 212 may process this altitude command and send the processed altitude command to auto-flight system 210. Auto-flight system 210 then uses the processed altitude command to control movement of aircraft 100.

In these illustrative examples, auto-flight system 210 may process commands 224 received from sources 220 to control engine 108, engine 110, control surfaces 120, and/or other systems in aircraft 100 in FIG. 1 to control movement of aircraft 100. The movement of aircraft 100 may be controlled in the air, on the ground, or both.

As depicted, auto-flight system 210 includes autopilot 226 and autothrottle system 228. Autopilot 226 is configured to control the positioning of control surfaces 120 for aircraft 100. Autothrottle system 228 is configured to control the performance of engine 108 and engine 110 in aircraft 100. Of course, autothrottle system 228 may control any number of engines that may be present in an aircraft.

In these illustrative examples, each of sources 220 of commands 224 may be allowed to send only certain types of commands to auto-flight system 210. In other words, each of sources 220 may be assigned certain types of commands that may be sent to auto-flight system 210. For example, remote source 222 may be only allowed to send commands of a first type to auto-flight system 210, while flight management system 212 may be allowed to send commands of the first type, a second type, and a number of other selected types.

The types of commands allowed to be sent to auto-flight system 210 from the different sources in sources 220 may be controlled by operator 204 using command controller 216. Command controller 216 may function in a manner similar to a switch or multiplexer.

In some illustrative examples, operator 204 may use command controller 216 to control which of sources 220 that are located within aircraft system 150 can send commands to auto-flight system 210. As one illustrative example, operator 204 may use command controller 216 to select which sources in sources 220 are allowed to send commands 224 to auto-flight system 210 and/or which sources in sources 220 are allowed to send different types of commands to auto-flight system 210. Further, when operator 204 is designated as a source for commands 224 to auto-flight system 210, operator 204 may enter user input 208 to generate commands 224 for auto-flight system 210 using command controller 216.

In the illustrative examples, operator 204 may interact with command controller 216 using control panel 230. Control panel 230 is a hardware system and may include a number of display devices in display system 202 and a number of input devices in input system 206. Control panel 230 includes graphical user interface 234 that is displayed on a display device for control panel 230 in display system 202 in these illustrative examples. Graphical user interface 234 is configured to provide operator 204 an interface to control movement of aircraft 100.

For example, operator 204 may interact with control panel 230 to operate command controller 216 to control trajectory 232 of aircraft 100. In these illustrative examples, trajectory 232 may be a path that aircraft 100 follows through space as a function of time to reach a destination. In other illustrative examples, trajectory 232 may be a vector of aircraft 100.

Operator 204 may use graphical user interface 234 to control trajectory 232 of aircraft 100. For example, operator 204 may enter user input 208 through input system 206 to interact with graphical user interface 234 to control movement of aircraft 100. Further, graphical user interface 234 may be configured to focus on trajectory 232 rather than on other modes of operation as in currently used mode control panels.

Additionally, operator 204 may control which source in sources 220 is used to send commands to auto-flight system 210 to control trajectory 232. In these illustrative examples, graphical user interface 234 may allow operator 204 to view sources 220 of commands 224, sources 220 that send commands 224 to auto-flight system 210, or a combination of the two.

For example, operator 204 may use command controller 216 to select source 236 in sources 220 as the source assigned to commands sent to auto-flight system 210 that are related to trajectory 232. In this manner, flight management system 212 may control trajectory 232 of aircraft 100. Trajectory 232 may be changed by selecting a different source from sources 220 for the commands sent to auto-flight system 210 that are related to trajectory 232.

Thus, one or more illustrative embodiments facilitate operator 204 controlling the movement of aircraft 100. For example, operator 204 may select flight management system 212 to control movement of aircraft 100, enter user input 208 to control the movement of aircraft 100, forward commands received from remote source 222 to auto-flight system 210, or some combination thereof in controlling sources 220 of commands 224 sent to auto-flight system 210.

Each source in sources 220 may have a number of assigned commands 223. Assigned commands 223 for a selected source are the particular types of commands that the selected source is allowed to send to auto-flight system 210. Assigned commands 223 may be the same or different between different sources in sources 220. For example, assigned commands 223 for flight management system 212 may be the same as assigned commands 223 for operator 204, except for commands that relate to altitude limits.

In particular, flight management system 212 may not be allowed to send commands relating to altitude limits, such as the air traffic control-assigned clearance altitude limit assigned by an air traffic controller, to auto-flight system 210. However, assigned commands 223 for flight management system 212 may allow flight management system 212 to send commands indicating altitude constraints set by flight management system 212 to auto-flight system 210.

Figure 3:
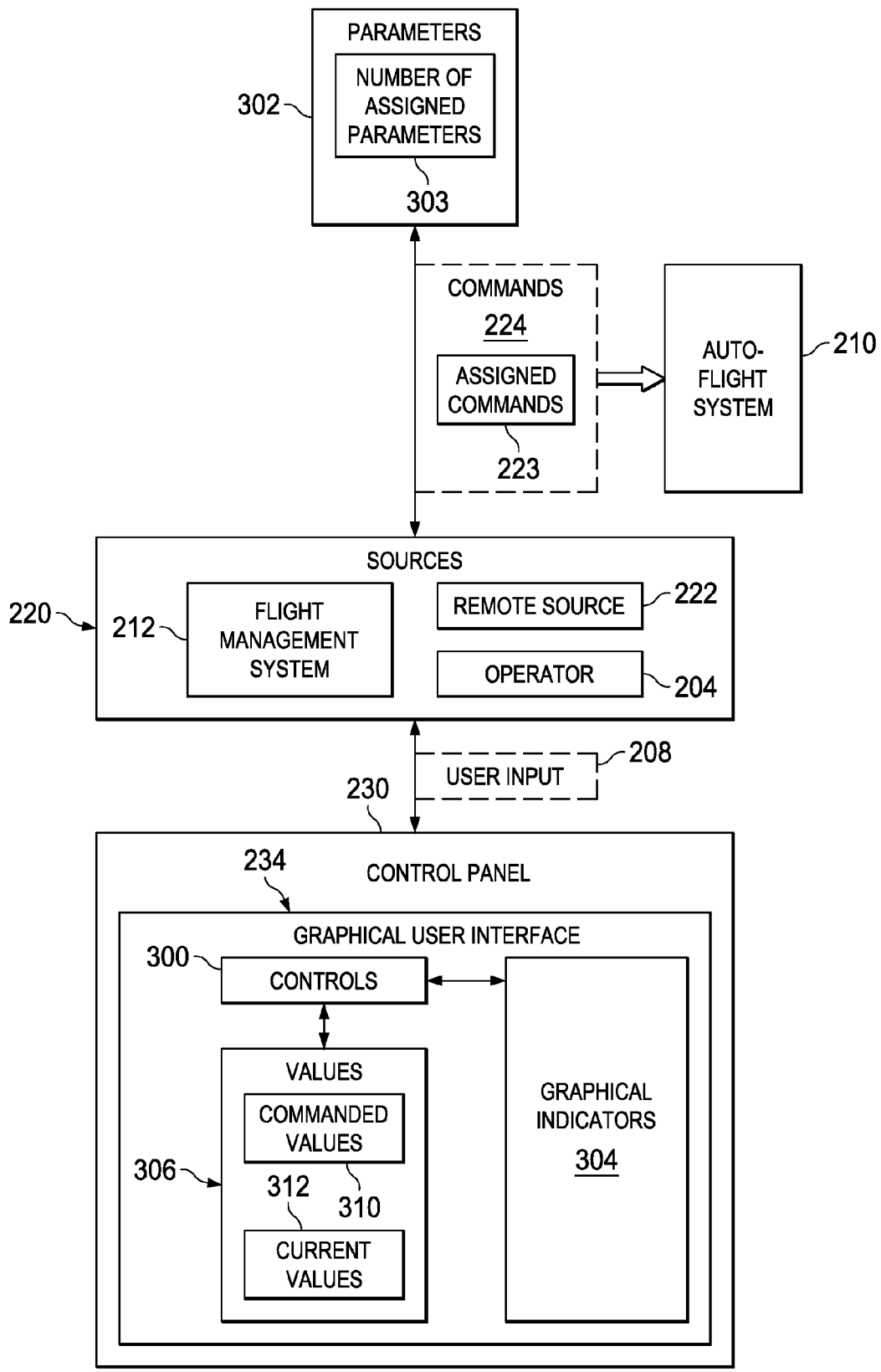
FIG. 3 is an illustration of controlling movement of an aircraft using a command controller in accordance with an illustrative embodiment.

Turning now to FIG. 3, an illustration of controlling movement of an aircraft using a command controller is depicted in accordance with an illustrative embodiment. As depicted, graphical user interface 234 in control panel 230 may be used by operator 204 to control sources 220 of commands 224. In these illustrative examples, operator 204 may generate user input 208 to control which source in sources 220 is a source of commands 224 for auto-flight system 210. As depicted, sources 220 include at least one of operator 204, flight management system 212, and remote source 222.

Operator 204 may manipulate controls 300 displayed on graphical user interface 234 to select a source from sources 220. Further, operator 204 may generate user input 208 to manipulate controls 300 to generate commands 224 when operator 204 is a source of commands 224.

In these illustrative examples, controls 300 may be used to generate commands 224 to control parameters 302. Parameters 302 may include number of assigned parameters 303 for each of sources 220. Number of assigned parameters 303 may include one or more parameters that are assigned to a particular source in sources 220. For example, operator 204 may manipulate controls 300 to select source 236 from FIG. 2. Number of assigned parameters 303 for source 236 may be the parameters for which source 236 may generate commands 224 to control parameters 302.

As a result, one source in sources 220 may have all of parameters 302 as number of assigned parameters 303, while another source in sources 220 may have a portion of parameters 302 as number of assigned parameters 303. For example, number of assigned parameters 303 for flight management system 212 may include speed, heading, and flight path angle. As another example, number of assigned parameters 303 for operator 204 may include speed, flight path angle, and altitude. The commands in commands 224 generated by a particular source that are configured to control number of assigned parameters 303 are assigned commands 223 for that source.

In some illustrative examples, each control in controls 300 may be associated with a parameter in parameters 302. In other words, each control in controls 300 corresponds to a parameter in parameters 302. Further, controls 300 may include a control for each source in sources 220 for a particular parameter.

In some cases, multiple controls in controls 300 may correspond to the same parameter in parameters 302 but different sources in sources 220. For example, a first control in controls 300 may correspond to speed under the control of operator 204, while a second control in controls 300 may correspond to speed under the control of flight management system 212.

As depicted, parameters 302 include parameters relating to trajectory 232 in FIG. 2 for aircraft 100 in FIG. 1. The parameters in parameters 302 relating to trajectory 232 may include, for example, at least one of an altitude, an indicated speed, a Mach number, a heading, a track, a vertical speed, a flight path angle, and other suitable parameters.

In these illustrative examples, operator 204 may manipulate controls 300 to select a source for a command to control each parameter in parameters 302. For example, operator 204 may select a control in controls 300 associated with a particular source in sources 220 to select that source as the source of a command to control the parameter corresponding to that control selected by operator 204.

In these illustrative examples, operator 204 may manipulate controls 300 such that some or all of parameters 302 may have the same source, depending on the implementation. Operator 204 may manipulate controls 300 such that a portion of parameters 302 is operated by at least one of operator 204, flight management system 212, remote source 222, or a combination of these or other sources.

In some illustrative examples, operator 204 may manipulate controls 300 such that flight management system 212 is assigned to generate commands relating to altitude based on altitudes in a flight plan. However, operator 204 may change the source of these types of commands to a different source, such as operator 204, when a certain altitude has been reached.

In yet another illustrative example, operator 204 may manipulate controls 300 such that different parameters in parameters 302 may have different sources. As a result, operator 204 may select a source for each parameter in parameters 302 using controls 300 in graphical user interface 234. When operator 204 is the source of commands 224, operator 204 may enter user input 208 through controls 300 to generate commands 224.

Further, graphical user interface 234 also may display graphical indicators 304 in association with controls 300. Graphical indicators 304 may indicate a source of commands 224 for parameters 302. These graphical indicators may take various forms. For example, the graphical indicator may be at least one of a color, a value for a parameter, a font type, an icon, and other suitable types of graphical indicators.

Also, values 306 may be displayed in association with controls 300. Values 306 are values for parameters 302 in these illustrative examples. In particular, values 306 may be displayed on controls 300 to indicate the values for parameters 302 corresponding to controls 300.

Values 306 may be commanded values 310, current values 312, or both. Commanded values 310 are values in values 306 that are set by commands 224. Current values 312 are the current values for parameters 302.

For example, a command in commands 224 sets the altitude in parameters 302 to 20,000 feet, and the aircraft is at 15,000 feet. The commanded value in commanded values 310 is 20,000 feet, and the current value in current values 312 is 15,000 feet.

Figure 4:
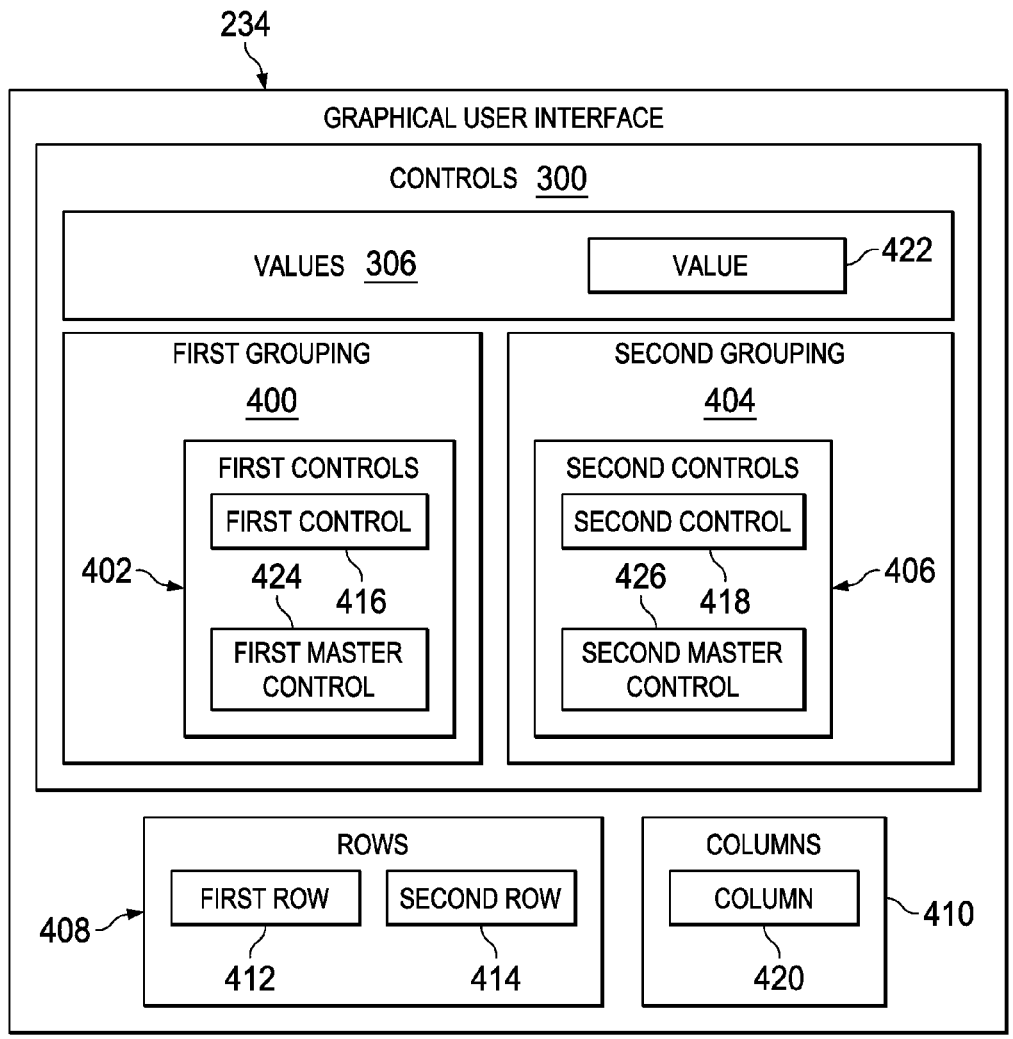
FIG. 4 is an illustration of a graphical user interface in accordance with an illustrative embodiment.

Turning next to FIG. 4, an illustration of a graphical user interface is depicted in accordance with an illustrative embodiment. An example of an implementation for graphical user interface 234 in FIGS. 2 and 3 is depicted.

In this illustrative example, graphical user interface 234 is configured to display controls 300 in display system 202 in FIG. 2. Controls 300 are controls for commands 224 that control the flight of aircraft 100 in FIG. 1 sent to auto-flight system 210 in these illustrative examples. In other words, controls 300 may be used to control a source of commands 224 from sources 220 that are sent to auto-flight system 210 in FIG. 2 to control the movement of aircraft 100. In particular, controls 300 may be used to control trajectory 232 in FIG. 2 of aircraft 100.

In other words, controls 300 in graphical user interface 234 may be used to control which source of commands 224 in sources 220 are sent to auto-flight system 210. For example, first grouping 400 of controls 300 are preset in graphical user interface 234. As illustrated, first grouping 400 of controls 300 includes first controls 402.

First grouping 400 of controls 300 is configured to control commands 224 generated by flight management system 212 in computer system 200 sent to auto-flight system 210. In other words, first grouping 400 of controls 300 is configured to determine which of commands 224 generated by flight management system 212 are sent to auto-flight system 210. The commands are commands that control number of assigned parameters 303 in parameters 302 in FIG. 3 that are assigned to flight management system 212.

Additionally, second grouping 404 of controls 300 are also present in graphical user interface 234. Second grouping 404 of controls 300 includes second controls 406. Second grouping 404 of controls 300 is configured to control commands 224 generated by user input 208 sent to auto-flight system 210. In other words, second grouping 404 of controls 300 are used to select which of commands 224 generated from user input 208 are sent to auto-flight system 210. The commands are commands that control number of assigned parameters 303 in parameters 302 that are assigned to operator 204.

More specifically, commands 224 generated by flight management system 212 and commands 224 generated by user input 208 may be for at least some of the same parameters. Controls 300 may control which commands in commands 224 for particular parameters in parameters 302 are sent to auto-flight system 210 in these illustrative examples.

In these illustrative examples, first grouping 400 of controls 300 and second grouping 404 of controls 300 may include different controls in controls 300. In other words, some of the controls in first grouping 400 of controls 300 and second grouping 404 of controls 300 may be the same, while other controls are different.

In these illustrative examples, first grouping 400 of controls 300 and second grouping 404 of controls 300 are arranged in rows 408 and columns 410. In particular, first grouping 400 of controls 300 is arranged in first row 412 within graphical user interface 234. Second grouping 404 of controls 300 is arranged in second row 414 within graphical user interface 234.

In these illustrative examples, first grouping 400 of controls 300 includes controls that correspond to controls in second grouping 404 of controls 300. This correspondence may be based on parameters 302.

For example, first control 416 in first row 412 is a control in first controls 402 forming first grouping 400 of controls 300. Second control 418 in second row 414 is a control in second controls 406 forming second grouping 404 of controls 300.

First control 416 and second control 418 both are used to control a source of commands 224 for the same parameter in parameters 302. For example, both first control 416 and second control 418 may be used to control commands 224 for a parameter in parameters 302, such as airspeed, direction of travel, altitude, and other suitable parameters.

In these illustrative examples, controls corresponding to the same parameter are placed in the same column. For example, first control 416 in first row 412 and second control 418 in second row 414 correspond to each other. First control 416 and second control 418 are both displayed in the same column, column 420 in columns 410, in these illustrative examples.

Additionally, controls 300 also may display values 306 for parameters 302. For example, first control 416 may display value 422 in values 306 on graphical user interface 234 for the parameter associated with the command controlling that parameter.

In this particular example, the selection of a control from first grouping 400 of controls 300 is configured to cause auto-flight system 210 to use a command associated with the control from flight management system 212. A selection of a control in second grouping 404 of controls 300 is configured to cause auto-flight system 210 to use a command associated with the control received from user input 208 in these illustrative examples. As depicted, user input 208 may comprise a selection of a control in second grouping 404 of controls 300 and a value for the parameter corresponding to the control.

In these illustrative examples, first grouping 400 of controls 300 may include first master control 424. The selection of first master control 424 results in auto-flight system 210 using commands 224 from flight management system 212. As depicted, flight management system 212 sets all commands 224 except for the air traffic control-assigned clearance limit altitude. This parameter is set by operator 204 in these illustrative examples.

Controls 300 also include second master control 426 in second grouping 404 in controls 300. A selection of second master control 426 is configured to cause auto-flight system 210 to use only commands 224 generated by user input 208.

In this manner, operator 204 may control sources 220 of commands 224. These sources may be controlled such that only a single source is present for most of commands 224 sent to auto-flight system 210. In other examples, operator 204 may control sources 220 such that commands 224 that come from more than one source for different types of commands may be sent to auto-flight system 210 for use in controlling movement of aircraft 100.

The illustration of aircraft system 150 in FIG. 2, control panel 230 in FIG. 3, and graphical user interface 234 in FIG. 4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some implementations, remote source 222 may not be used as a source of commands 224. In another illustrative example, although control panel 230 is illustrated as using first controls 402, other types of controls also may be used. For example, control panel 230 also may include physical controls, such as dials or knobs. These physical controls may be used to set values in addition to and/or in place of graphical controls used to set values for parameters in graphical user interface 234.

In yet another illustrative example, controls 300 may be grouped differently from the illustrative example in FIG. 4. The grouping may be performed by placing different groupings in different regions instead of arranging controls by rows and columns. Controls corresponding to the same parameter may be indicated using graphical indicators or through other mechanisms.

In some cases, if a control assigned to control a parameter in one group may not always have a corresponding control that controls that parameter in another group, the other group may still include a control in the same column. In this case, this control may merely provide information about current values or estimated current values.

For example, vertical speed and flight path angle in parameters 302 may be controlled by user input from operator 204, such as a pilot, in the illustrative examples. These parameters are not controlled by flight management system 212. With this illustrative example, a control may be associated with flight management system 212 that functions as a display. This control is actually a display that indicates estimated values for vertical speed or flight path angle based on information about the aircraft and atmospheric conditions.

In other illustrative examples, flight management system 212 may control vertical speed, flight path angle, or both. In this type of implementation, the control displays a value set for the parameter.

Figure 5:
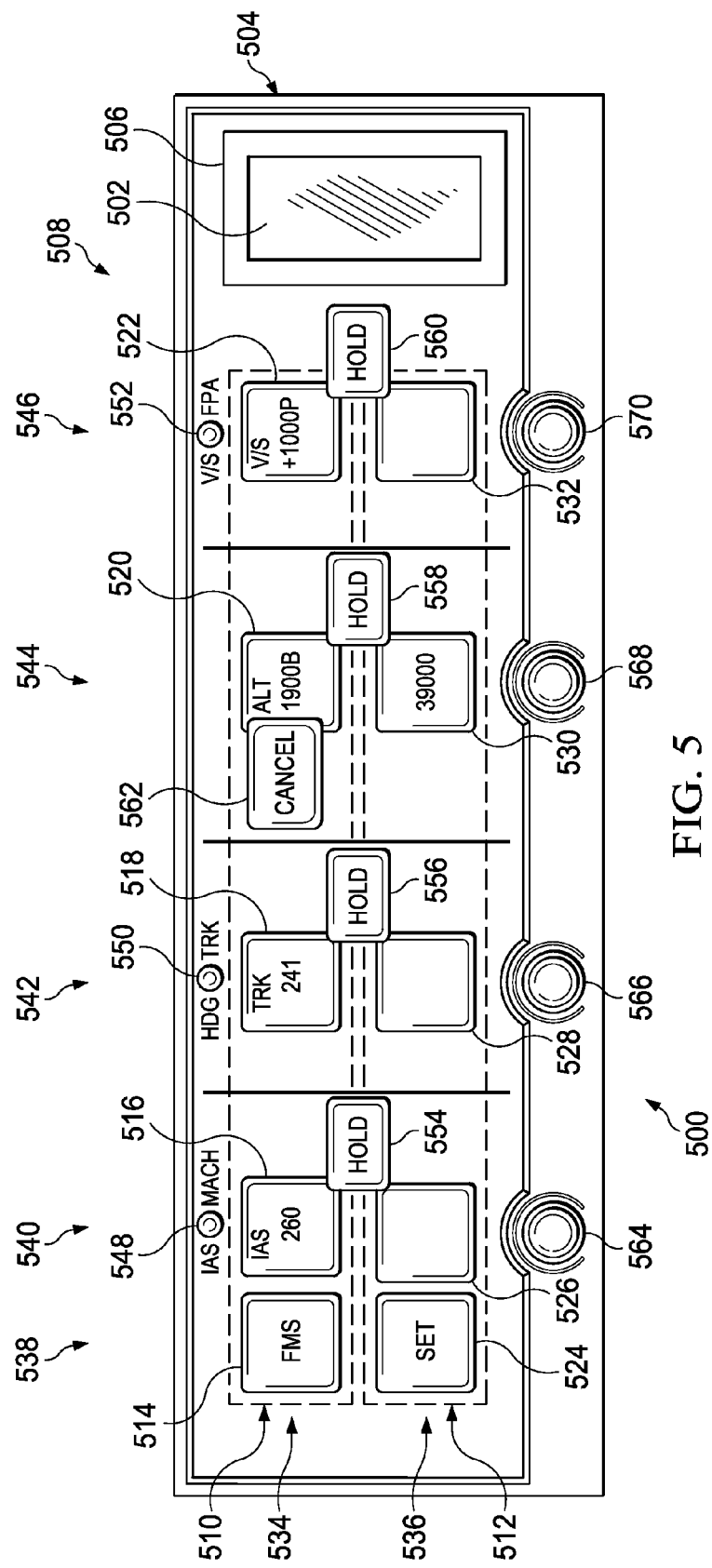
FIG. 5 is an illustration of a control panel in accordance with an illustrative embodiment.

With reference now to FIG. 5, an illustration of a control panel is depicted in accordance with an illustrative embodiment. Control panel 500 is an example of an implementation for control panel 230 in FIG. 2.

As depicted, control panel 500 is a physical device. In particular, control panel 500 comprises display device 502 associated with frame 504. Display device 502 is a display device within display system 202 in FIG. 2. In these illustrative examples, display device 502 takes the form of a touch-screen device. As a result, display device 502 also may function as an input device.

In these illustrative examples, graphical user interface 506 is displayed on display device 502. Graphical user interface 506 is an example of an implementation for graphical user interface 234 in FIG. 2.

As depicted, controls 508 are present on control panel 500. In this illustrative example, controls 508 include first grouping 510 of controls 508 and second grouping 512 of controls 508. Each of these groupings is associated with a different source of commands that may be sent to an auto-flight system, such as auto-flight system 210 in FIG. 2.

In this illustrative example, first grouping 510 is for controls 508 that control commands from a first source. Second grouping 512 in controls 508 is for controlling commands from a second source.

For example, first grouping 510 of controls 508 is for controlling commands from flight management system 212 sent to auto-flight system 210 in FIG. 2 in these illustrative examples. Second grouping 512 of controls 508 is configured to control commands generated from user input 208 from operator 204 that are sent to auto-flight system 210 in FIG. 2.

In these illustrative examples, first grouping 510 comprises controls 514, 516, 518, and 522. Second grouping 512 of controls 508 comprises controls 524, 526, 528, 530, and 532. As can be seen, the parameters controlled by flight management system 212 and operator 204 are not the same in this example.

As can be seen, controls 514-532 are arranged in rows and columns. Row 534 comprises controls 514-522 in first grouping 510. Row 536 comprises controls 524-532 in second grouping 512.

In these illustrative examples, column 538, column 540, column 542, column 544, and column 546 are present. Each column is associated with a command parameter. Controls within a column control which source sends commands to the auto-flight system for a parameter in these illustrative examples.

As depicted, column 538 includes control 514 in first grouping 510 and control 524 in second grouping 512. Column 540 includes control 516 in first grouping 510 and control 526 in second grouping 512. Column 542 includes control 518 in first grouping 510 and control 528 in second grouping 512.

Column 544 includes control 520 in first grouping 510 and control 530 in second grouping 512. Column 546 includes control 522 and control 532 in second grouping 512.

Although control 522 is illustrated in column 546, this control is not part of first grouping 510 in this illustrative example. The parameters, vertical speed, and flight path angle are not controlled by flight management system 212 in this illustrative example. With this example, control 522 provides an interface to display estimated values for vertical speed, flight path angle, or both. In other illustrative examples, these parameters may actually be controlled by control 522 and part of first grouping 510.

In the illustrative examples, the selection of a control in column 538 selects a source for the commands to be sent to auto-flight system 210. The controls in column 538 are examples of master controls. As depicted, column 540 selects a source for commands relating a parameter to the indicated airspeed or Mach number of the aircraft. Column 542 is used to select a source of commands for a parameter for a heading or track of the aircraft. Column 544 contains controls used to select a source for commands relating to a parameter for the altitude of the aircraft. Column 546 contains controls relating to a source of commands for a parameter for vertical speed or flight path angle of the aircraft.

The parameter in the different columns may be selected using controls 548, 550, and 552. These controls may be used to change the parameter displayed or controlled.

In these illustrative examples, control 548 is associated with column 540 and may be used to select whether the parameter is airspeed or Mach numbers. Control 550 is associated with column 542 and may control whether the parameter is for a heading or track. Control 552 is located in column 546. This control may be used to select whether the controls in this column are for vertical speed or flight path angle.

Controls 514-532 also may display information about a parameter controlled by the command. In these examples, the information includes values for the parameters.

In these illustrative examples, controls 508 also include controls 554, 556, 558, and 560. These controls may indicate when a parameter reaches a desired value. The indication may be provided through a change in color of the control, an animation of the control, a display of a graphical indicator on the control, or some other suitable type of visual indication.

Additionally, these controls also may be used to send a command to hold the aircraft at a particular value when the control is selected for use. For example, control 554 is associated with airspeed or Mach number, control 556 is associated with heading or track, control 558 is associated with altitude, and control 560 is associated with vertical speed or flight path angle. These controls may be used to hold the particular parameter at the value present when the control is selected for use to hold that value.

Controls 508 also may include control 562. Control 562 is a cancel button that may be used to cancel a particular altitude. If control 562 is selected, the next altitude constraint is used in place of the current one as the new altitude constraint. In other words, the current altitude constraint is replaced with a new altitude constraint in these illustrative examples.

Further, in these illustrative examples, the altitude parameter is set by user input through control 530. This altitude parameter is a limit. For example, the limit may be a maximum or minimum altitude that may be reached, depending on whether the aircraft is climbing or descending in the illustrative examples.

Additionally, controls 508 also may include physical controls. In these illustrative examples, the physical controls include control 564, 566, 568, and 570. In these illustrative examples, each of these controls may be used to set values for commands to be sent to the autopilot. For example, control 564 is associated with control 526. Control 566 is associated with control 528. Control 568 is associated with control 530. Control 570 is associated with control 532. These physical controls may be used to set values for parameters associated with a particular column of controls in this illustrative example. In these illustrative examples, controls 508 also may include controls for other functions in addition to controlling a source of commands or generating commands.

As depicted, control 522 displays estimated values for vertical speed or flight path angle.

Figure 6:
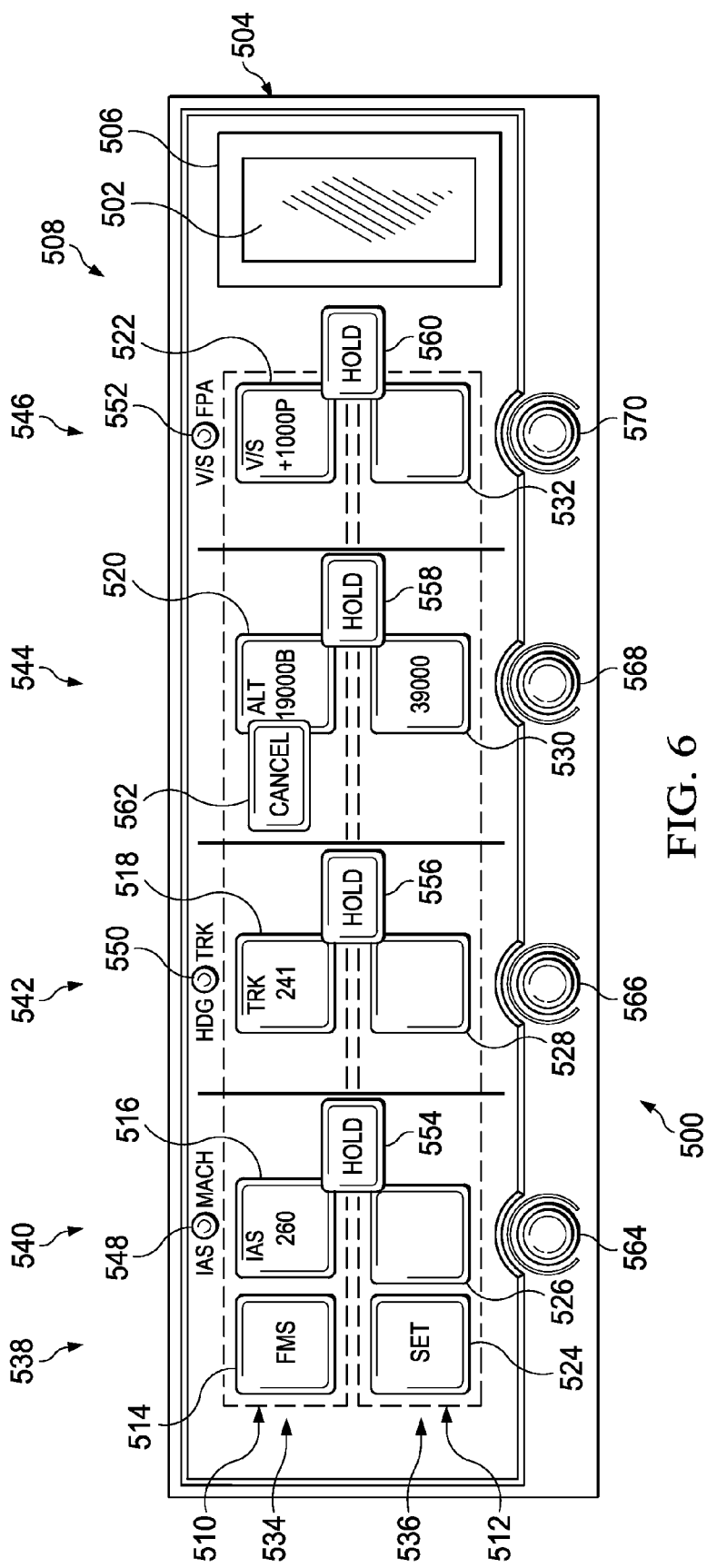
FIG. 6 is an illustration of a control panel in accordance with an illustrative embodiment.

With reference now to FIG. 6, an illustration of a control panel is depicted in accordance with an illustrative embodiment. In this illustrative example, control 514 in row 534 of controls 508 has been selected. The selection of this control causes the parameters to be controlled by flight management system 212 in FIG. 2. In other words, flight management system 212 is the source of commands that are sent to auto-flight system 210 in FIG. 2.

In the depicted examples, operator 204 in FIG. 2 will remain the source of the air traffic control-assigned clearance limit altitude. In these illustrative examples, values are displayed on controls 516, 518, 520, and 522. Values are not displayed on controls 526, 528, and 532. Although control 530 displays a value, this value is a maximum value for altitude set by user input 208 in FIG. 2. This value, however, does not represent a current command.

Further, a graphical indicator also may be included in addition to the displayed value. For example, these values may be displayed in a selected color, such as magenta. This selected color may be used to indicate which source is the source of commands in these illustrative examples.

Figure 7:
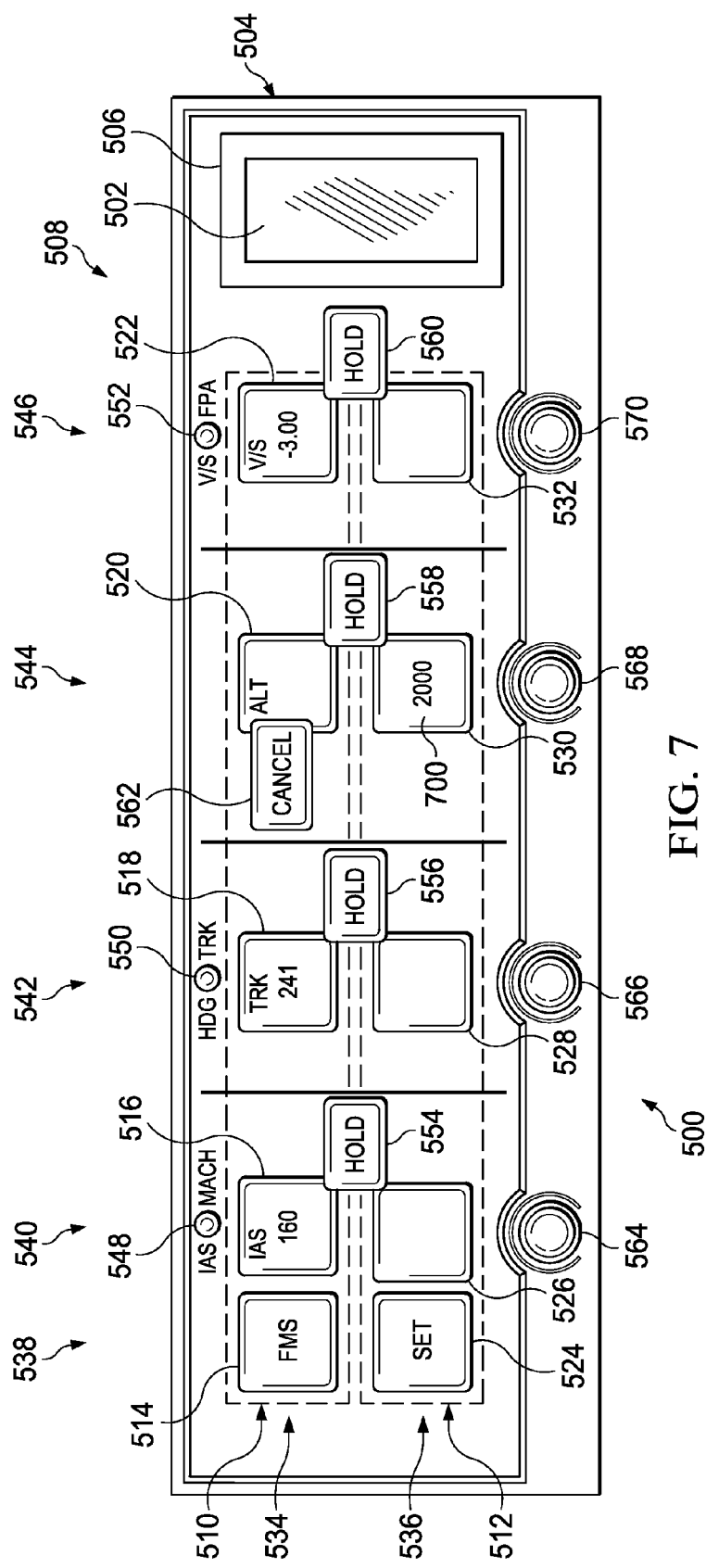
FIG. 7 is another illustration of a control panel in accordance with an illustrative embodiment.

With reference now to FIG. 7, an illustration of a control panel is depicted in accordance with an illustrative embodiment. In this illustrative example, control 530 has been selected by the user. A selection of control 530 and an entry of a value results in the user input being the source of the command for altitude to auto-flight system 210 instead of flight management system 212 or remote source 222 in FIG. 2.

In this illustrative example, the indication of user input 208 in FIG. 2 being the source of the command for altitude is indicated by display of value 700 on control 530. Further, the value previously displayed on control 520 is no longer displayed on this control. In this example, flight management system 212 is still the source of commands for other parameters other than altitude.

Figure 8:
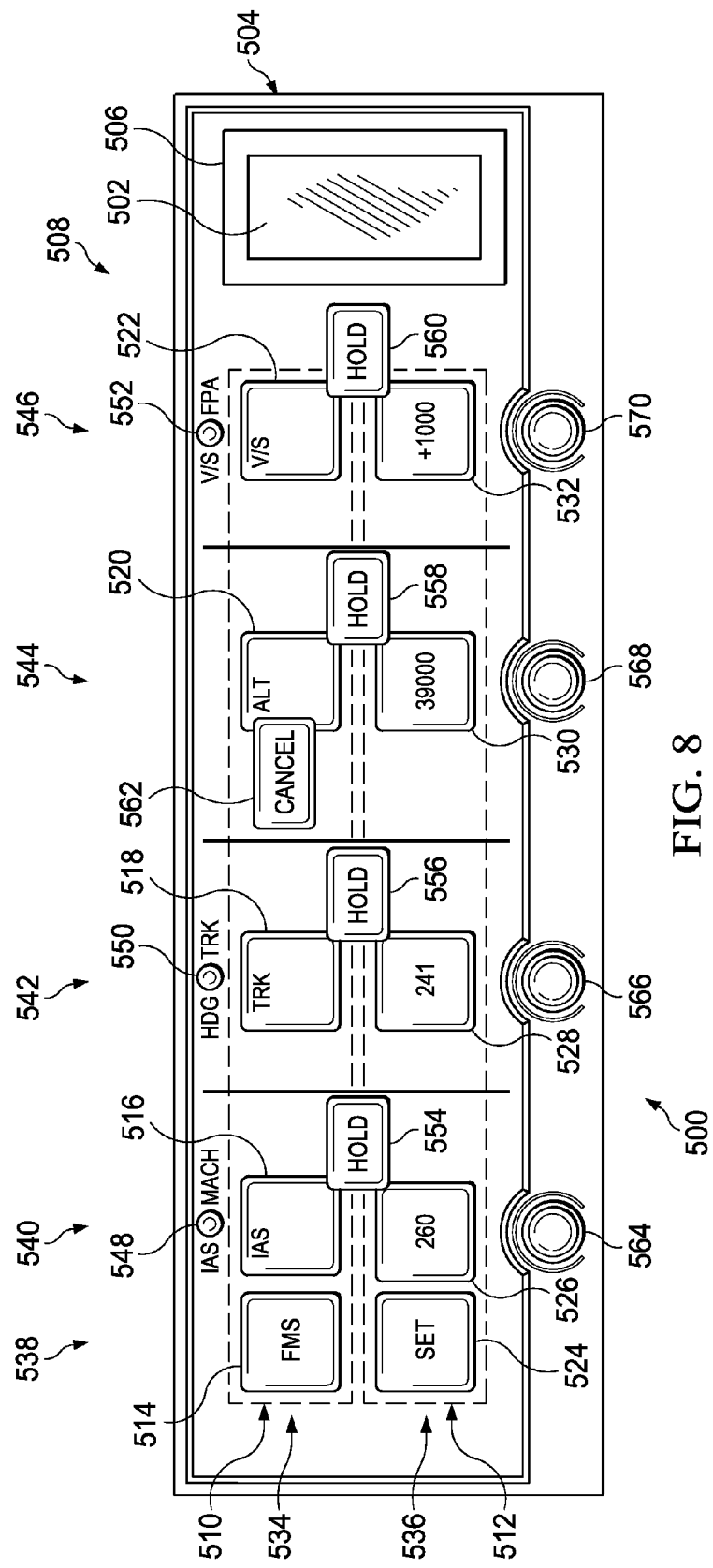
FIG. 8 is an illustration of a control panel in accordance with an illustrative embodiment.

With reference now to FIG. 8, an illustration of a control panel is depicted in accordance with an illustrative embodiment. In this illustrative example, control 524 has been selected by the user. The selection of this control results in the source of commands being those from user input 208 in FIG. 2. The indication of the source of commands is indicated graphically. In these illustrative examples, the graphical indication is through the display of values on controls 526, 528, and 530. Also, values are no longer displayed on controls 516, 518, and 520.

Figure 9:
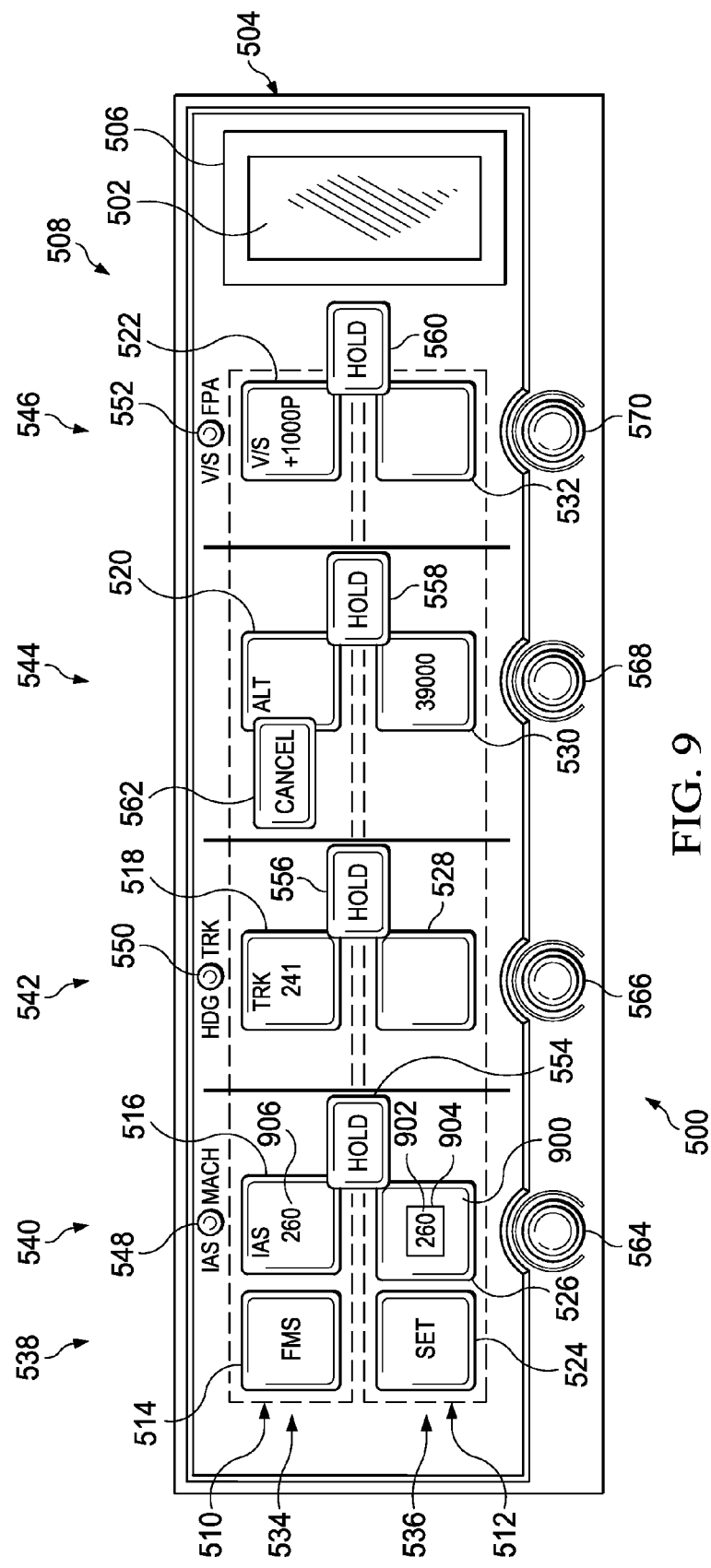
FIGS. 9 and 10 are illustrations of a process for changing a source of commands for a parameter in accordance with an illustrative embodiment.
Figure 10:
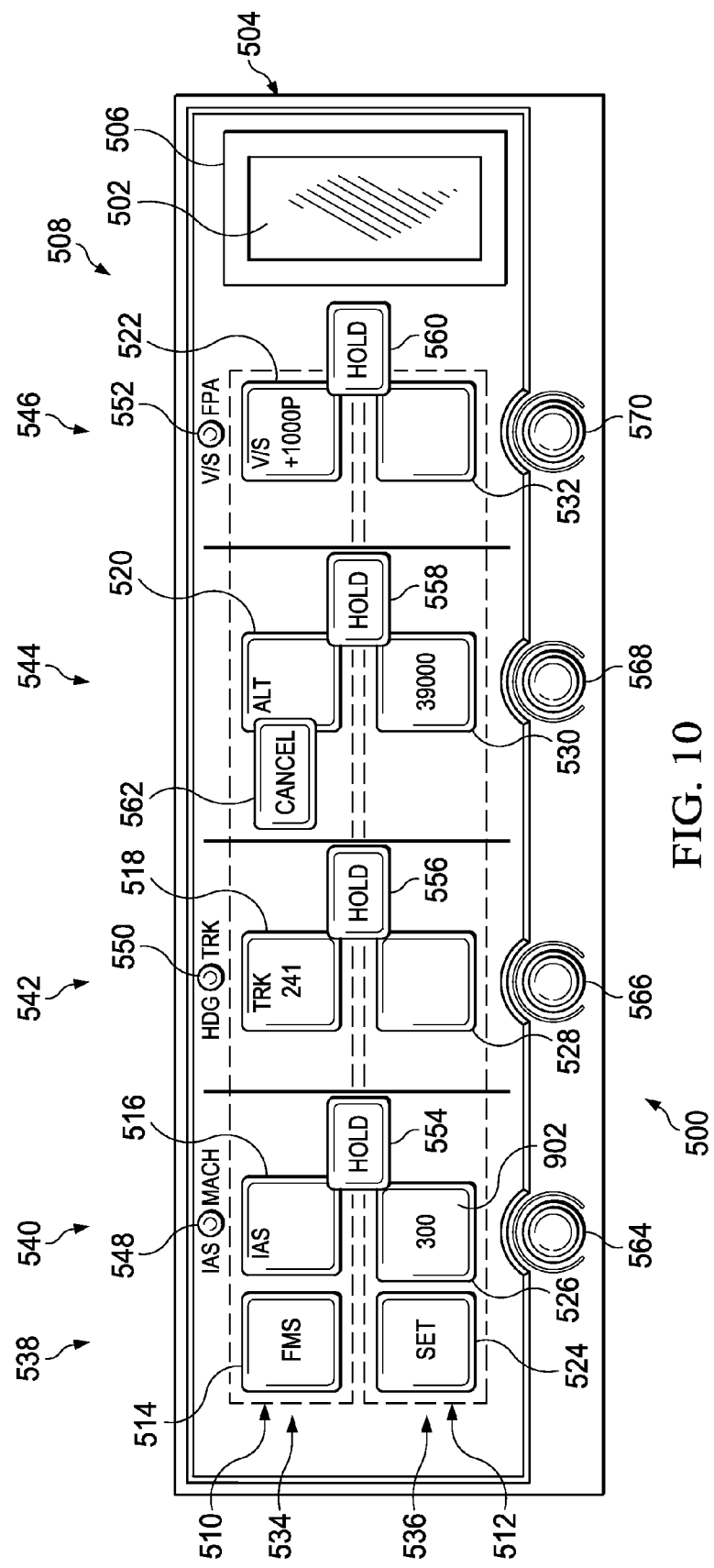

With reference now to FIGS. 9-10, illustrations of a process for changing a source of commands for a parameter is depicted in accordance with an illustrative embodiment. In this illustrative example, in FIG. 9, control 526 has been selected by a user.

In this illustrative example, a selection of control 526 results in graphical indicator 900 being displayed on control 526. Graphical indicator 900 takes the form of value 902 and box 904 being displayed around value 902.

In this illustrative example, value 902 is a default value. Value 902 is the same as value 906 displayed in control 516. Of course, other default values other than the value set from commands by flight management system 212 in FIG. 2 may be used in other implementations. In these illustrative examples, other types of graphical indicators may be used to indicate that a value may be set for control 526. For example, graphical indicator 900 may have an animation. In one illustrative example, box 904 may not be displayed. Instead, value 902 may be displayed as flashing or with some other animation.

In these illustrative examples, value 902 displayed on control 526 may be changed using control 564. Control 564 may be turned to change the value displayed on control 526. Once the desired value has been reached for value 902, control 526 or control 564 may be selected to set the value of the parameter.

In FIG. 10, the value has been changed and set. When the value is set, the white box is removed from control 526. Further, value 906 is no longer displayed on control 516.

Figure 11:
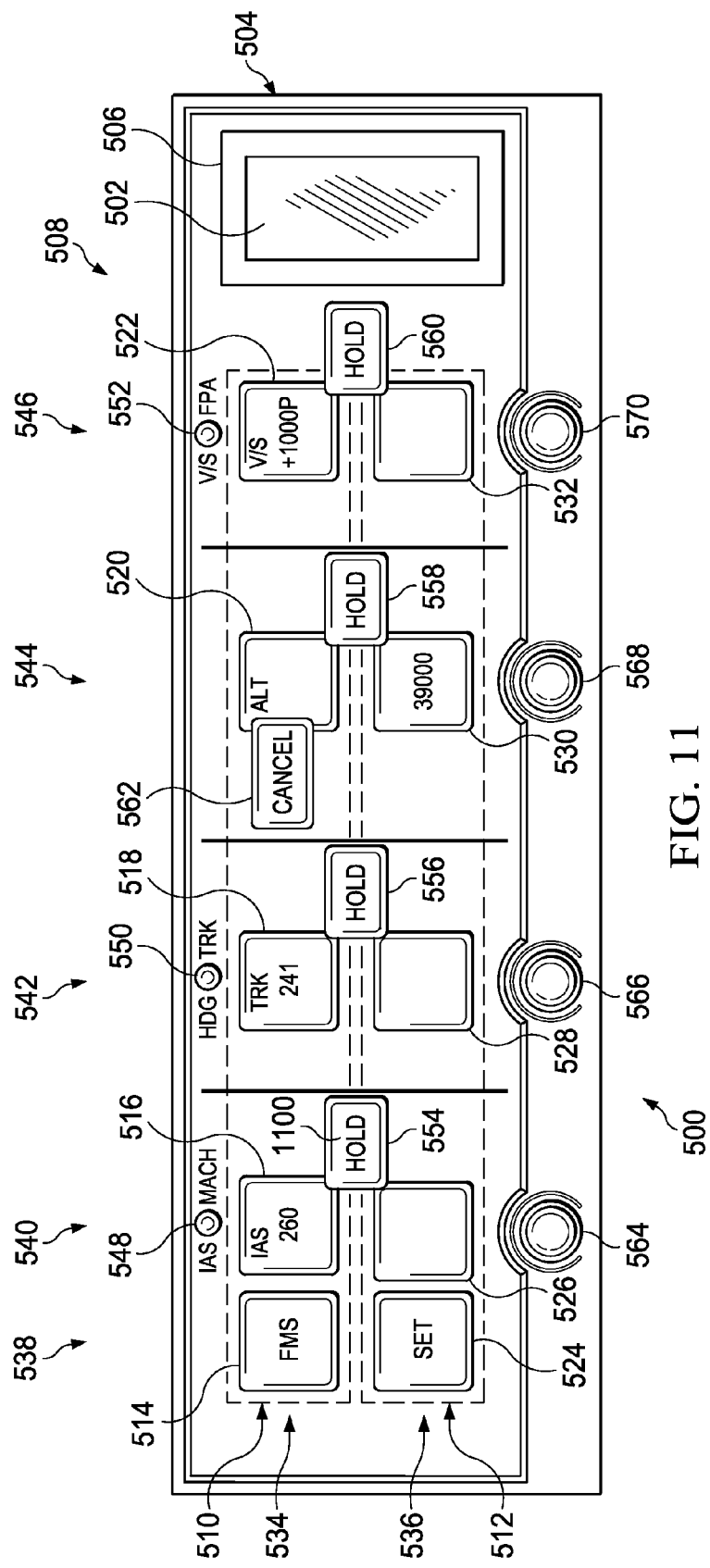
FIG. 11 is an illustration of a selection of a hold button on a control panel in accordance with an illustrative embodiment.

Turning next to FIG. 11, an illustration of a selection of a hold button on a control panel is depicted in accordance with an illustrative embodiment. In this example, control 554 has been selected. Control 554 is a hold button, and the selection of this control results in graphical indicator 1100 being displayed.

In this illustrative example, graphical indicator 1100 displays the word "hold" in a different color form other hold buttons in the controls. The selection of this control results in the airspeed being held at the desired value.

Figure 12:
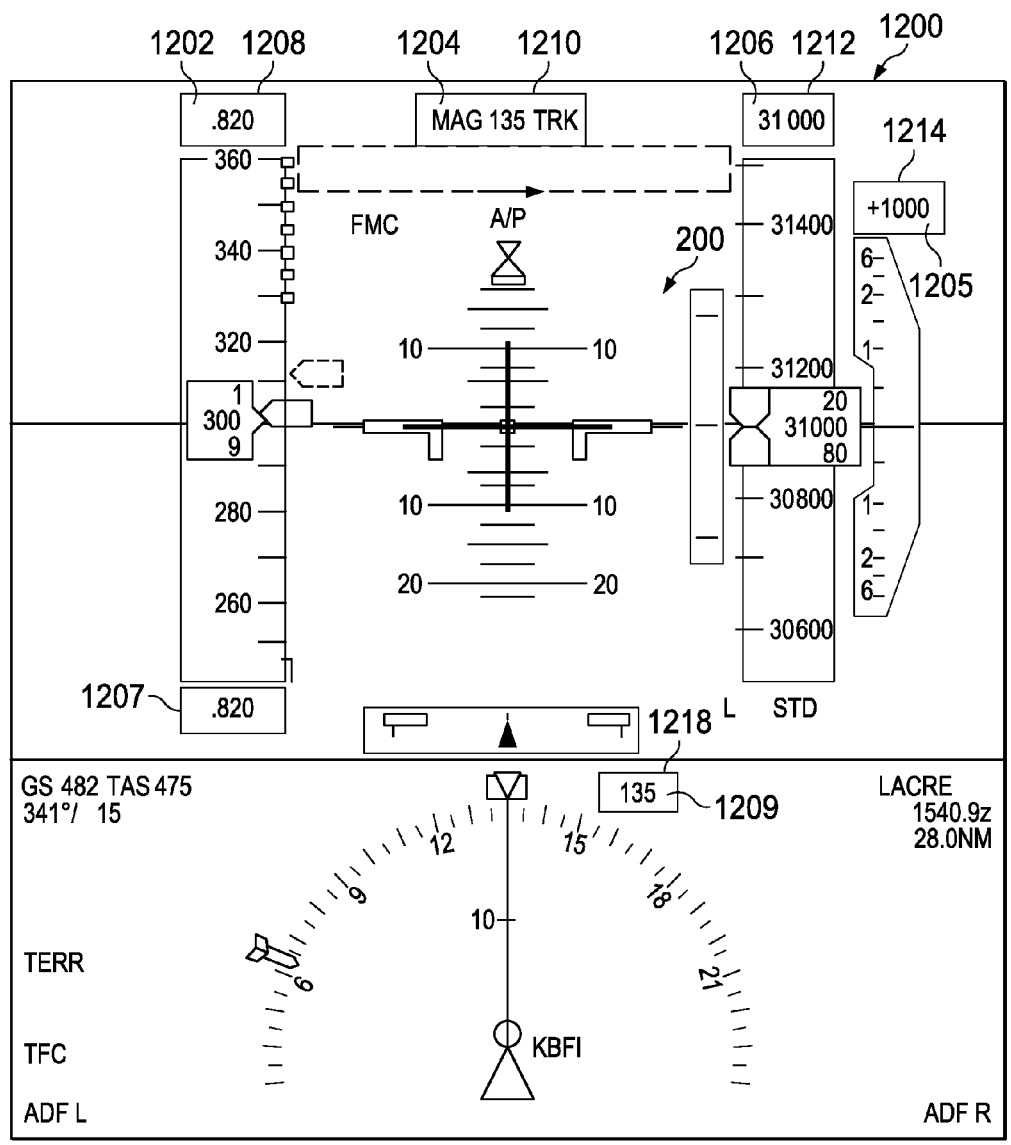
FIG. 12 is an illustration of a primary flight display in accordance with an illustrative embodiment.

With reference now to FIG. 12, an illustration of a primary flight display is depicted in accordance with an illustrative embodiment. In this illustrative example, primary flight display 1200 is an example of primary flight display 218 in FIG. 2.

In this illustrative example, primary flight display 1200 displays commanded values for parameters set in a control panel. The commanded value may be a trajectory target value in these examples. The current commanded value is the active trajectory target value. The active trajectory target value may change if the operator changes the value or the flight management system selects a new value as the aircraft progresses along a flight plan.

The display of values in primary flight display 1200 for the parameters may occur automatically. The display of these commanded values may be based on the current parameters controlled through control panel 500 in FIG. 5. For example, control panel 500 may be used to control indicated commanded values for parameters, such as airspeed, Mach number, heading, track, altitude, vertical speed, and flight path angle. The commanded values set by the commands for these parameters also may be displayed in primary flight display 1200.

In these illustrative examples, corresponding values for the parameters may be displayed in fields 1202, 1204, 1205, and 1206. Fields 1202, 1204, 1205, and 1206 contain commanded values.

For example, field 1202 may display indicated airspeed or a Mach number. Field 1204 may display a heading or track. Field 1205 may display the vertical speed or flight path angle. Field 1206 may display the altitude. Field 1202 is associated with control 516 and control 526 in column 540 in FIG. 5 for indicated airspeed or Mach number. Field 1204 is associated with control 518 and control 528 in column 542 in FIG. 5 for indicated heading or track. Field 1206 is associated with control 530 in column 544 in FIG. 5 for indicated altitude. In these illustrative examples, the value for the air traffic control-assigned clearance limit altitude set by the operator using control 530 is displayed in field 1206, but commanded values by flight management system 212 in control 520 are not displayed in field 1206. In other implementations, these commanded values set by commands from flight management system 212 and displayed on control 520 also may be displayed in field 1206.

Further, control 514 and control 524 may act as master controls. Selection of one of these two controls in control panel 500 may be used to affect the display of values in multiple fields from fields 1202, 1204, 1205, and 1206. For example, a selection of control 514 in FIG. 5 affects the display of values in fields 1202, 1204, and 1205. A selection of control 524 in FIG. 5 affects the display of fields 1202, 1204, and 1206.

As depicted, the fields display the commanded values that are displayed in controls in control panel 500 that correspond to the fields in primary flight display 1200. In other words, the commanded value shown in a control in control panel 500 is displayed in the field in primary flight display 1200 that is associated with the control in control panel 500. For example, if control 516 in control panel 500 has been set to have a commanded value of 0.820, that value is also displayed in field 1202 in primary flight display 1200 in these illustrative examples. In these illustrative examples, Mach numbers are used in fields 1202 and 1207 when an aircraft is above about 26,000 feet.

In the illustrative examples, current values are displayed in fields 1207 and 1209. Field 1207 may display the current value for the indicated airspeed or Mach number. Field 1209 may display the current value for the track or heading. These current values in fields 1207 and 1209 may correspond to the commanded values in fields 1202, 1204, 1205, and 1206, respectively. The values in the corresponding fields are the same when the current values are the same as the active trajectory track values that have been set.

These fields also may indicate the source of the commands in addition to values for the commands. Graphical indicators 1208, 1210, 1212, 1214, and 1218 may be used to indicate the source of the values. For example, graphical indicators 1208, 1210, 1212, 1214, and 1218 are associated with fields 1202, 1204, 1206, 1205, and 1209, respectively.

In these illustrative examples, these graphical indicators take the form of colors in the fields to indicate the source of the commands. For example, graphical indicator 1210 may be the color magenta to indicate that the source of the command for a particular field is flight management system 212 in FIG. 2, while graphical indicator 1208 and graphical indicator 1210 may be the color white to indicate that user input 208 in FIG. 2 is the source of the commands.

In this illustrative example, graphical indicator 1208 for field 1202 and graphical indicator 1212 for field 1206 indicate that the source of the command for these parameters is user input 208. Graphical indicator 1210 for field 1204 indicates that the source of the command for this parameter is flight management system 212.

The illustration of control panel 500 and primary flight display 1200 in FIGS. 5-12 is not meant to imply physical or architectural limitations to the manner in which the control panel and primary flight display may be implemented. For example, controls 556, 558, 560, and 562 may be omitted. In particular, all controls may be performed using a touch-screen. For example, additional graphical controls may be added in the form of dials, sliders, and other controls to change values for parameters for commands in control panel 500.

As another example, other numbers of columns and rows may be present, depending on the particular implementation. As another example, another row of controls may be present for commands received from a remote source, such as a navigation aid, a ground station operator, or other aircraft. In yet another illustrative example, controls 548, 550, 552, and 554 may be omitted. Additional controls may be present on graphical user interface 506 in control panel 500 for additional parameters instead of switching between parameters as illustrated in this example.

As another example, the fields in primary flight display 1200 in FIG. 12 may include other fields in addition to or in place of the ones illustrated. These fields may be displayed in other displays in addition to or in place of primary flight display 1200. For example, these fields may be displayed in a separate display just for these fields, in a navigation display, or some other suitable display.

As another example, vertical speed or flight path angle may be controlled by flight management system 212. If these parameters are in number of assigned parameters 303 for flight management system 212, then control 522 in FIGS. 5-11 may display commanded values rather than estimated values as described above.

Figure 13:
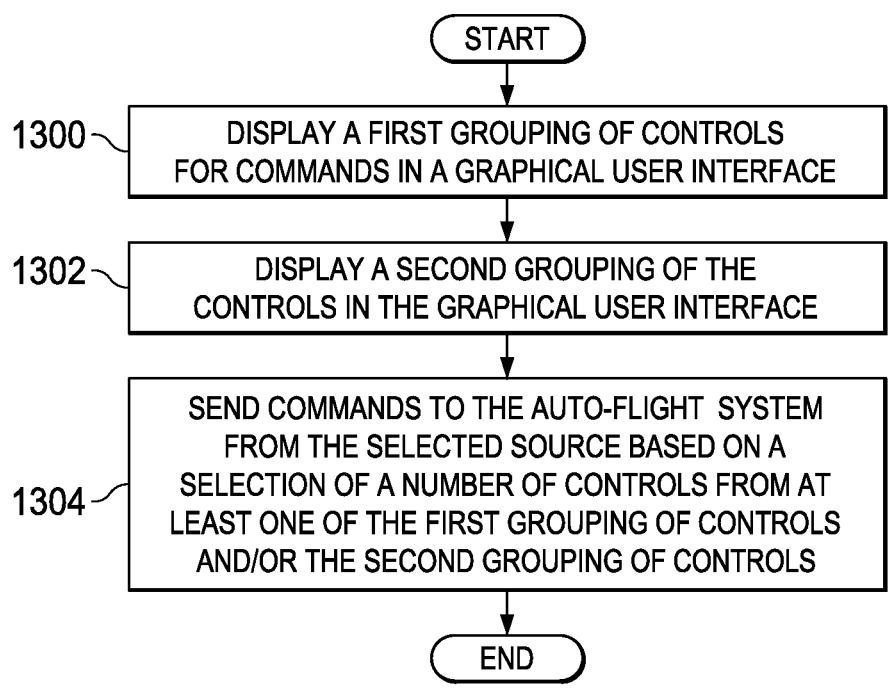
FIG. 13 is an illustration of a flowchart of a process for controlling an aircraft in accordance with an illustrative embodiment.

With reference now to FIG. 13, an illustration of a flow-chart of a process for operating an aircraft with user input from an operator is depicted in accordance with an illustrative embodiment. The process illustrated in FIG. 13 may be implemented in aircraft system 150 in FIG. 1 to control the movement of aircraft 100. In particular, the process may be implemented using command controller 216. An operator, such as a pilot, may generate user input using command controller 216 to operate the aircraft.

The process begins by displaying a first grouping of controls for commands in a graphical user interface (operation 1300). The first grouping of controls is configured to control the sending of commands to an auto-flight system from a first source. In this example, the first source is a flight management system. The process then displays a second grouping of the controls in the graphical user interface (operation 1302). The second grouping of controls is configured to control the sending of the commands to the auto-flight system. The process then sends commands to the auto-flight system from the selected source based on a selection of a number of controls from at least one of the first grouping of controls and/or the second grouping of controls (operation 1304), with the process terminating thereafter.

Figure 14:
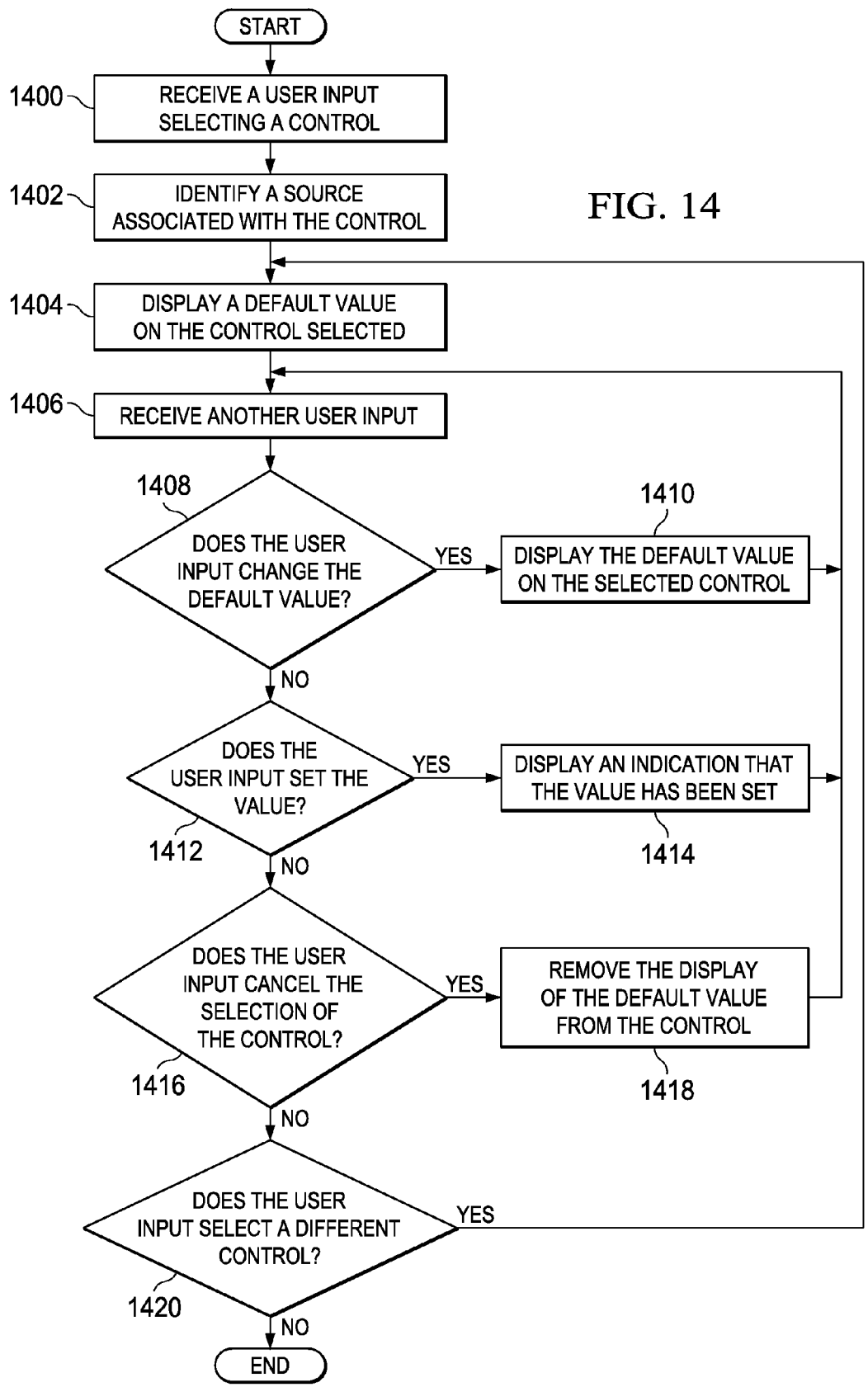
FIG. 14 is an illustration of a flowchart of a process for selecting a source of commands in accordance with an illustrative embodiment.

With reference now to FIG. 14, an illustration of a flow-chart of a process for selecting an operator setting a source of commands is depicted in accordance with an illustrative embodiment. This process may be implemented using control panel 230 in FIG. 2. In the illustrative examples, the operator is a pilot of the aircraft.

The process begins by receiving a user input selecting a control (operation 1400). The user input is received from the operator. In response to receiving the user input, the process identifies a source associated with the control (operation 1402). The process displays a default value on the control selected (operation 1404). The process then receives another user input (operation 1406).

A determination is made as to whether the user input changes the default value (operation 1408). If the user input changes the default value, the process displays the default value on the selected control (operation 1410). The process then returns to operation 1406 as described above. If the user input does not change the default value in operation 1408, a determination is made as to whether the user input sets the value (operation 1412). The value set is a commanded value for the parameter associated with the control and may be an active trajectory target. If the user input sets the value, the process displays an indication that the value has been set (operation 1414). The process then returns to operation 1406 as described above.

If the user input does not set the value in operation 1412, a determination is made as to whether the user input cancels the selection of the control (operation 1416). If the user input cancels the selection of the control, the display of the default value is removed from the control (operation 1418), with the process then returning to operation 1406 as described above.

If the user input in operation 1416 does not cancel the selection of the control, a determination is made as to whether the user input selects a different control (operation 1420). If the user input selects a different control, the process returns to operation 1404 as described above. If the user input does not select a different control, the process terminates.

With this process, an operator may generate commands to set one or more parameters for operating the aircraft. The operator may set some parameters using this process while other parameters may be set using commands from another source, such as a flight management system.

Figure 15:
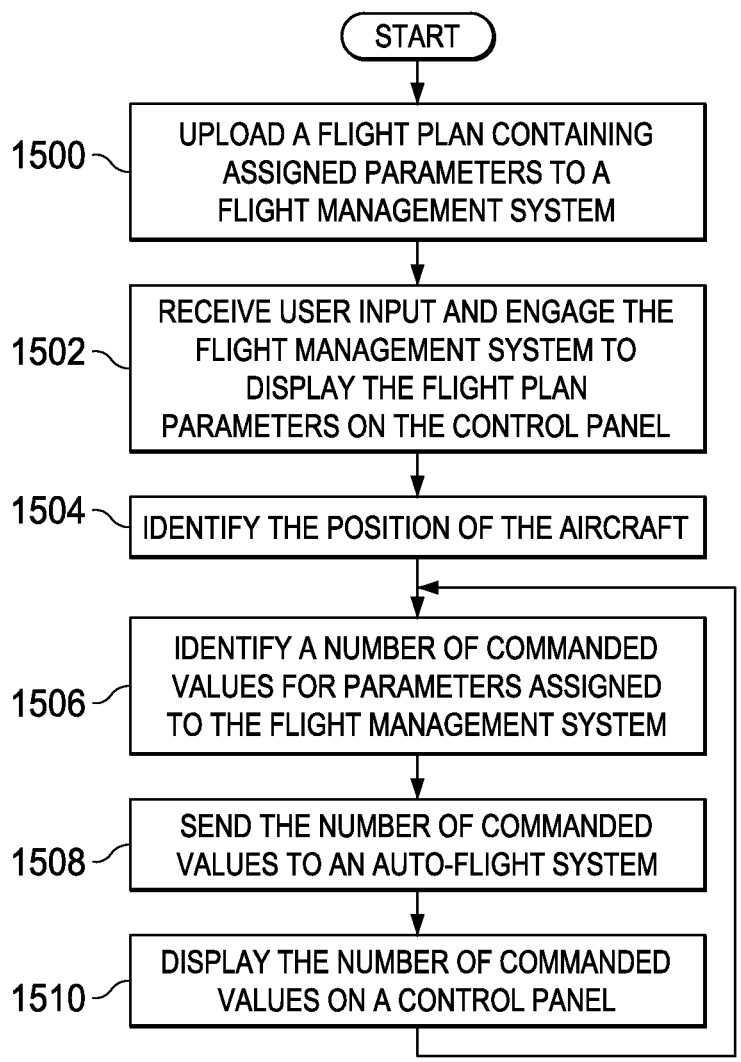
FIG. 15 is an illustration of a flowchart of a process for operating an aircraft with a flight management system as the source of commands in accordance with an illustrative embodiment.

With reference now to FIG. 15, an illustration of a flowchart of a process for operating an aircraft with a flight management system as the source of commands is depicted in accordance with an illustrative embodiment. This process may be implemented using flight management system 212 in FIG. 2.

The process begins by uploading a flight plan containing assigned parameters to a flight management system (operation 1500). Next, user input is received by the operator of the aircraft and engages the flight management system to display the flight plan parameters on the control panel (operation 1502).

The flight management system then identifies the position of the aircraft (operation 1504). The current position may be in three-dimensional space. For example, the current position may be measured as latitude, longitude, and altitude. The process identifies a number of commanded values for parameters assigned to the flight management system (operation 1506). The number of commanded values is sent to an autoflight system (operation 1508). Next, the number of commanded values is displayed on a control panel (operation 1510), with the process returning to operation 1506.

The process repeats these steps while the flight management system remains engaged. Of course, an operator may control the commands for some of the parameters using control panel 500 in FIG. 5 and the process illustrated in FIG. 14.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, operation 1402 and operation 1404 may be performed at the same time. In another illustrative example, additional sources of the commands may be present in addition to and/or in place of the flight management system and the operator. For example, a remote source to the aircraft may be a source of commands in some illustrative examples.

Figure 16:
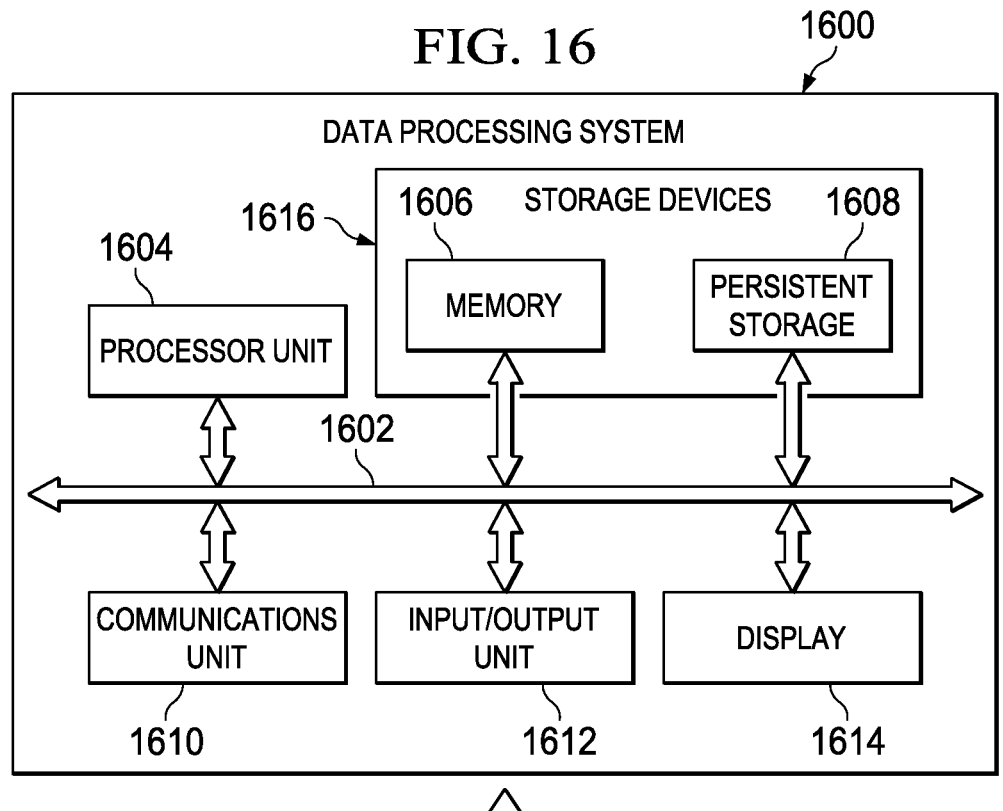
FIG. 16 is an illustration of a data processing system in accordance with an illustrative embodiment.
Figure 16:
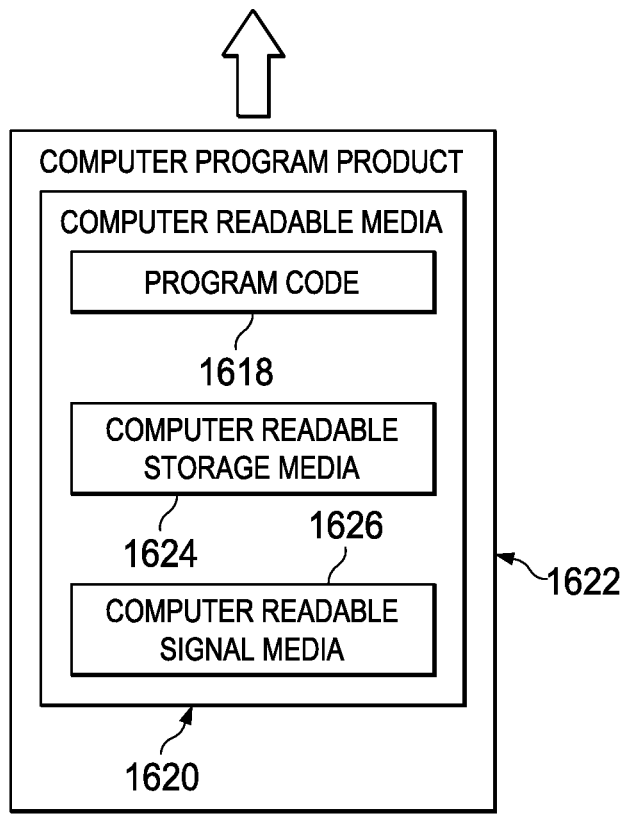

Turning now to FIG. 16, an illustration of a data processing system is depicted in accordance with an illustrative embodiment. Data processing system 1600 may be used to implement one or more computers in computer system 200 in FIG. 2. In this illustrative example, data processing system 1600 includes communications framework 1602, which provides communications between processor unit 1604, memory 1606, persistent storage 1608, communications unit 1610, input/output (I/O) unit 1612, and display 1614. In these examples, communications unit 1610 may be a bus system.

Processor unit 1604 serves to execute instructions for software that may be loaded into memory 1606. Processor unit 1604 may be a number of processors, a multi-processor core, or some other type of processor, depending on the particular implementation. A number, as used herein with reference to an item, means one or more items. Further, processor unit 1604 may be implemented using a number of heterogeneous processor systems in which a main processor is present with secondary processors on a single chip. As another illustrative example, processor unit 1604 may be a symmetric multi-processor system containing multiple processors of the same type.

Memory 1606 and persistent storage 1608 are examples of storage devices 1616. A storage device is any piece of hardware that is capable of storing information, such as, for example, without limitation, data, program code in functional form, and/or other suitable information either on a temporary basis and/or a permanent basis. Storage devices 1616 may also be referred to as computer readable storage devices in these examples. Memory 1606, in these examples, may be, for example, a random access memory or any other suitable volatile or non-volatile storage device. Persistent storage 1608 may take various forms, depending on the particular implementation.

For example, persistent storage 1608 may contain one or more components or devices. For example, persistent storage 1608 may be a hard drive, a flash memory, a rewritable optical disk, a rewritable magnetic tape, or some combination of the above. The media used by persistent storage 1608 also may be removable. For example, a removable hard drive may be used for persistent storage 1608.

Communications unit 1610, in these examples, provides for communications with other data processing systems or devices. In these examples, communications unit 1610 is a network interface card. Communications unit 1610 may provide communications through the use of either or both physical and wireless communications links.

Input/output unit 1612 allows for input and output of data with other devices that may be connected to data processing system 1600. For example, input/output unit 1612 may provide a connection for user input through a keyboard, a mouse, and/or some other suitable input device. Further, input/output unit 1612 may send output to a printer. Display 1614 provides a mechanism to display information to a user.

Instructions for the operating system, applications, and/or programs may be located in storage devices 1616, which are in communication with processor unit 1604 through communications framework 1602. In these illustrative examples, the instructions are in a functional form on persistent storage 1608. These instructions may be loaded into memory 1606 for execution by processor unit 1604. The processes of the different embodiments may be performed by processor unit 1604 using computer-implemented instructions, which may be located in a memory, such as memory 1606.

These instructions are referred to as program code, computer usable program code, or computer readable program code that may be read and executed by a processor in processor unit 1604. The program code in the different embodiments may be embodied on different physical or computer readable storage media, such as memory 1606 or persistent storage 1608.

Program code 1618 is located in a functional form on computer readable media 1620 that is selectively removable and may be loaded onto or transferred to data processing system 1600 for execution by processor unit 1604. Program code 1618 and computer readable media 1620 form computer program product 1622 in these examples.

In one example, computer readable media 1620 may be computer readable storage media 1624 or computer readable signal media 1626. Computer readable storage media 1624 may include, for example, an optical or magnetic disk that is inserted or placed into a drive or other device that is part of persistent storage 1608 for transfer onto a storage device, such as a hard drive, that is part of persistent storage 1608.

Computer readable storage media 1624 also may take the form of a persistent storage, such as a hard drive, a thumb drive, or a flash memory, that is connected to data processing system 1600. In some instances, computer readable storage media 1624 may not be removable from data processing system 1600. In these examples, computer readable storage media 1624 is a physical or tangible storage device used to store program code 1618 rather than a medium that propagates or transmits program code 1618. Computer readable storage media 1624 is also referred to as a computer readable tangible storage device or a computer readable physical storage device. In other words, computer readable storage media 1624 is a media that can be touched by a person.

Alternatively, program code 1618 may be transferred to data processing system 1600 using computer readable signal media 1626. Computer readable signal media 1626 may be, for example, a propagated data signal containing program code 1618. For example, computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1618 may be downloaded over a network to persistent storage 1608 from another device or data processing system through computer readable signal media 1626 for use within data processing system 1600. For instance, program code stored in a computer readable storage medium in a server data processing system may be downloaded over a network from the server to data processing system 1600. The data processing system providing program code 1618 may be a server computer, a client computer, or some other device capable of storing and transmitting program code 1618.

The different components illustrated for data processing system 1600 are not meant to provide architectural limitations to the manner in which different embodiments may be implemented. The different illustrative embodiments may be implemented in a data processing system including components in addition to or in place of those illustrated for data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components. For example, a storage device may be comprised of an organic semiconductor.

In another illustrative example, processor unit 1604 may take the form of a hardware unit that has circuits that are manufactured or configured for a particular use. This type of hardware may perform operations without needing program code to be loaded into a memory from a storage device to be configured to perform the operations.

For example, when processor unit 1604 takes the form of a hardware unit, processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 1618 may be omitted, because the processes for the different embodiments are implemented in a hardware unit. In another example, a bus system may be used to implement communications framework 1602 and may be comprised of one or more buses, such as a system bus or an input/output bus.

Illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an illustrative embodiment may be implemented. In this example, aircraft 1800 is produced by aircraft manufacturing and service method 1700 in FIG. 17 and may include airframe 1802 with a plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1700 in FIG. 17. In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712 and/or during maintenance and service 1714 in FIG. 17. The use of a number of the different illustrative embodiments may substantially expedite the assembly of and/or reduce the cost of aircraft 1800.

In particular, an aircraft system may be implemented in aircraft 1800 during various phases of aircraft manufacturing and service method 1700. For example, an aircraft system may be designed to include a command control system in accordance with an illustrative embodiment during specification and design 1702.

As another illustrative example, components for a command control system may be manufactured and produced during component and subassembly manufacturing 1706. The command and control system may be integrated during system integration 1708. Further, in the different illustrative embodiments, a command and control system, in accordance with an illustrative embodiment, may be used to operate aircraft 1800 while in service 1712. As still another illustrative example, a command and control system may be implemented in aircraft 1800 during maintenance and service 1714. This integration may be an upgrade, reconfiguration, refurbishment, or other operation.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different benefits as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft system comprising:
    a display system;
    a graphical user interface configured to display controls on the display system, wherein the controls are for commands sent to an auto-flight system in an aircraft that control flight of the aircraft;
    a first grouping of the controls in the graphical user interface, wherein the first grouping of the controls is configured to control sending of the commands to the auto-flight system from a flight management system in the aircraft; and
    a second grouping of the controls in the graphical user interface, wherein the second grouping of the controls is configured to control sending of the commands to the auto-flight system from a user input to the graphical user interface.

2. The aircraft system of claim 1, wherein the graphical user interface is a first graphical user interface and further comprising:
    a second graphical user interface displayed in the display system, wherein the second graphical user interface is configured to display information about movement of the aircraft; and
    a number of graphical indicators configured to display the commands sent to the auto-flight system and indicate a source of the commands.

3. The aircraft system of claim 1, wherein the first grouping of the controls is arranged in a first row in the graphical user interface and wherein the second grouping of the controls is arranged in a second row in the graphical user interface.

4. The aircraft system of claim 3, wherein a first control in the first row and a second control in the second row are associated with a parameter and are displayed in a same column in the graphical user interface, wherein the first control and the second control are configured to control commands for the parameter.

5. The aircraft system of claim 1, wherein a control in the controls is associated with a command and the control is configured to display a value for a parameter controlled by the command.

6. The aircraft system of claim 1, wherein a selection of a control from the first grouping of the controls is configured to cause the auto-flight system to use a command associated with the control from the flight management system.

7. The aircraft system of claim 1, wherein a selection of a control from the second grouping of the controls is configured to cause the auto-flight system to use a command associated with the control received from the user input.

8. The aircraft system of claim 7, wherein the user input comprises a selection of the control and a value of a parameter associated with the control.

9. The aircraft system of claim 8, wherein the value of the parameter is received by another control for setting values.

10. The aircraft system of claim 1, wherein the first grouping of the controls includes a first master control and selection of the first master control is configured to cause the auto-flight system to use only the commands from the flight management system.

11. The aircraft system of claim 10, wherein the second grouping of the controls includes a second master control and selection of the second master control is configured to cause the auto-flight system to use only the commands from the user input.

12. The aircraft system of claim 1, wherein a command in the commands is selected from one of an altitude, an indicated speed, a Mach number, a heading, a track, a vertical speed, and a flight path angle.

13. The aircraft system of claim 1, wherein the commands control a path that the aircraft travels through space as a function of time to reach a destination.

14. An aircraft system comprising:
    a display system;
    a graphical user interface configured to display controls on the display system, wherein the controls are for commands sent to an auto-flight system for an aircraft and control a flight of the aircraft; and
    a plurality of groupings of the controls in the graphical user interface, wherein a grouping in the plurality of groupings of the controls is configured to control sending the commands to the auto-flight system from sources of the commands, wherein the grouping of the controls corresponds to a source in the sources of the commands, and wherein a remote source remote from the aircraft sends the commands to the source in the sources of the commands.

15. The aircraft system of claim 14, wherein the source in the sources of the commands comprises a flight management system in the aircraft and wherein a selection of a control from the grouping of the controls is configured to cause the auto-flight system to use the commands associated with the control from the flight management system in the aircraft.

16. A method for controlling an aircraft, the method comprising:
    displaying a first grouping of controls for commands in a graphical user interface, wherein the controls are for the commands sent to an auto-flight system in an aircraft that control a flight of the aircraft and wherein the first grouping of the controls is configured to control sending of the commands to the auto-flight system from a flight management system;
displaying a second grouping of the controls in the graphical user interface, wherein the second grouping of the controls is configured to control sending of the commands to the auto-flight system from a user input to the graphical user interface; and
sending the commands to the auto-flight system from at least one of the flight management system and from the user input based on a selection of a number of controls from at least one of the first grouping of the controls and the second grouping of the controls.

17. The method of claim 16 further comprising:
displaying the first grouping of the controls in a first row in the graphical user interface; and
displaying the second grouping of the controls in a second row in the graphical user interface.

18. The method of claim 17, wherein a first control in the first row and a second control in the second row are associated with a parameter and are configured to control commands for the parameter further comprising:
displaying the first control and the second control in a same column in the graphical user interface.

19. The method of claim 16, wherein a control in the controls is associated with a command and further comprising:
displaying a value for a parameter controlled by the command on the control.

20. The method of claim 16, wherein a selection of a control from the first grouping of the controls is configured to cause the auto-flight system to use a command associated with the control from the flight management system.

* * * * *